(12) United States Patent
Hashimoto et al.

(10) Patent No.: US 7,287,183 B2
(45) Date of Patent: Oct. 23, 2007

(54) ELECTRONIC CONTROL UNIT

(75) Inventors: Kohji Hashimoto, Tokyo (JP); Katsuya Nakamoto, Tokyo (JP); Yuki Iwagami, Tokyo (JP); Akihiro Ishii, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 599 days.

(21) Appl. No.: 10/788,370

(22) Filed: Mar. 1, 2004

(65) Prior Publication Data

US 2005/0015160 A1    Jan. 20, 2005

(30) Foreign Application Priority Data

Jul. 14, 2003    (JP)    ............... 2003-196507

(51) Int. Cl.
*G06F 11/00* (2006.01)
(52) U.S. Cl. .................. 714/10; 714/11; 714/704; 714/706
(58) Field of Classification Search .......... 714/18, 714/20, 704, 706, 10–13
See application file for complete search history.

(56) References Cited

U.S. PATENT DOCUMENTS

| | | | | |
|---|---|---|---|---|
| 4,385,383 A | * | 5/1983 | Karchevski | .......... 714/706 |
| 4,511,958 A | * | 4/1985 | Funk | .............. 714/4 |
| 5,784,274 A | * | 7/1998 | Murayama et al. | ........... 700/79 |
| 6,098,179 A | * | 8/2000 | Harter, Jr. | .......... 714/4 |
| 6,393,590 B1 | * | 5/2002 | Wood et al. | ............ 714/55 |
| 6,745,120 B2 | * | 6/2004 | Iwagami et al. | ............ 701/114 |

FOREIGN PATENT DOCUMENTS

| | | |
|---|---|---|
| JP | 09-162814 A | 6/1997 |
| JP | 09-219720 A | 8/1997 |
| JP | 2000-267948 A | 9/2000 |
| JP | 2002-108835 A | 4/2002 |
| JP | 2002-235598 A | 8/2002 |

* cited by examiner

*Primary Examiner*—Yolanda L Wilson
(74) *Attorney, Agent, or Firm*—Sughrue Mion, PLLC

(57) ABSTRACT

First and second control circuit sections that mutually communicate via a series-parallel converter comprise first and second adder-subtracter respectively. When any receiving error occurs in each control circuit section, a variation value 3 is added to the adder-subtracter on the receiving side. When data is normally received, a variation value 1 is subtracted from the adder-subtracter. Initial value of the adder-subtracter is set to 9. When a current value exceeds 11, first and second error detection signal is generated to carry out alarm display or initialization, and initialization and restart of the other-side control circuit section.

18 Claims, 15 Drawing Sheets

| ADDRESS | b7 | b6 | b5 | b4 | b3 | b2 | b1 | b0 | |
|---|---|---|---|---|---|---|---|---|---|
| 00 | | | | | | | | | REGULAR REPORT PERMISSION |
| 01 | | | | | | | | | NORMAL-SIDE LIMIT VALUE |
| 02 | | | | | | | | | ABNORMAL-SIDE LIMIT VALUE |
| 03 | | | | | | | | | INITIALIZATION VALUE |
| 04 | | | | | | | | | FIRST VARIATION VALUE |
| 05 | | | | | | | | | SECOND VARIATION VALUE |
| 06 | | | | | | | | | THIRD VARIATION VALUE |
| 07 | | | | | | | | | REPLY RESPONSE ACCEPTABLE TIME PERIOD |
| 08 | | | | | | | | | RECEIVING INTERVAL ACCEPTABLE TIME PERIOD |
| 09 | | | | | | | | | |
| 0A | Y07 | Y06 | Y05 | Y04 | Y03 | Y02 | DR2 | DR1 | INDIRECT OUTPUT 1 |
| 0B | Y17 | Y16 | Y15 | Y14 | Y13 | Y12 | Y11 | Y10 | INDIRECT OUTPUT 2 |

REGULAR TRANSMISSION ORDER IS ALTERNATE TRANSMISSION OF 0A AND 0B

| ADDRESS | b7 | b6 | b5 | b4 | b3 | b2 | b1 | b0 | |
|---|---|---|---|---|---|---|---|---|---|
| 10 | FLAG | INPUT ADDRESS | | | ADDITION AND SUBTRACTION CURRENT VALUE | | | | STATUS MEMORY |
| | | 0H | | | 0H | | | | |
| 11 | X07 | X06 | X05 | X04 | X03 | X02 | X01 | X00 | INDIRECT OUTPUT 1 |
| | X17 | X16 | X15 | X14 | X13 | X12 | X11 | X10 | INDIRECT OUTPUT 2 |
| 12 | UPPER 8 BITS | | | | | | | | ANALOG 1 |
| | LOWER 8 BITS | | | | | | | | |
| 13 | UPPER 8 BITS | | | | | | | | ANALOG 2 |
| | LOWER 8 BITS | | | | | | | | |
| 14 | UPPER 8 BITS | | | | | | | | ANALOG 3 |
| | LOWER 8 BITS | | | | | | | | |
| 15 | UPPER 8 BITS | | | | | | | | ANALOG 4 |
| | LOWER 8 BITS | | | | | | | | |
| 16 | UPPER 8 BITS | | | | | | | | ANALOG 5 |
| | LOWER 8 BITS | | | | | | | | |
| 17 | BIT SECTION | ADDRESS | | | | | ERROR CODE | | SELECTED DATA MEMORY |

ELECTRONIC CONTROL UNIT

The Applicant has filed a relevant patent application in U.S.A. on the same date (the corresponding Japanese Patent Application filed on Aug. 8, 2003 under the Patent Application No. 290006/2003).

BACKGROUND OF THE INVENTION

1. Field of the Invention

The present invention relates to an electronic control unit having a microprocessor built-in for use e.g., in a fuel supply control of an automobile engine and, more particularly, to an electronic control unit that comprises a plurality of control circuit sections electrically divided so as to carry out a mutual communication of serial signals, and includes improved error determination means for serial communication.

2. Description of the Related Art

Electronic control unit in which information exchange by a method of serial communication is carried out among a plurality of microprocessors sharing functions, and communication error is detected to carry out error processing, has been practically and widely used in various fields.

For example, according to the Japanese Patent Publication (unexamined) No. 219720/1997, the following method and unit for detecting failure in a communication network is proposed. In this method and unit, data that comes in via a communication network is obtained, whether or not a data error occurs is detected, and it is checked whether or not the number of data errors having been detected by the above-mentioned procedure exceeds a predetermined value within a predetermined time period. Further, it is arranged such that in the case of exceeding the above-mentioned predetermined value, a transmission error is determined to occur in the above-mentioned communication network; while in the case of being not more than the above-mentioned predetermined value, a transmission error is determined not to occur in the above-mentioned communication network; and a failure in the communication network will be detected based on this determination result of the transmission error. In this manner, it is possible to perform appropriate switching of a duplex system without being sensitively responsive also to a transitional error, thereby enabling to improve efficiency in maintenance.

In addition, according to the Japanese Patent Publication (unexamined) No. 162814/1997, the following communication-monitoring unit is proposed. This communication monitoring unit comprises a communication control section that controls data communication and outputs an error notification signal upon detecting any communication error, an error counter that counts up in response to the input of the above-mentioned error notification signal, and an annunciation section that announces a communication error in response to the fact that a count value of this error counter has reached a plus predetermined value (threshold). In this communication-monitoring unit, there is provided counter subtraction means that counts down a count value of the above-mentioned error counter upon the fact that the control of data communication is normally carried out in the above-mentioned communication control section. Further it is arranged so as to prevent an alarm generation in vain with respect to a sporadic and chronic error in which an error state automatically recovers, while immediately making an annunciation with respect to a fatal and continuous failure.

Further, according to the Japanese Patent Publication (unexamined) No. 267948/2000, the following electronic device or a control method thereof is proposed. This electronic device comprises a first unit having a first computer and a second unit that includes a second computer, and is constructed detachably with respect to the above-mentioned first unit. In this electronic device, the above-mentioned first computer comprises means for transmitting an operation confirmation signal in order to confirm the operation of the above-mentioned second computer to the above-mentioned second computer at intervals of a predetermined time period; and the above-mentioned second computer comprises means for replying an in-operation signal indicating a normal operation in response to the above-mentioned confirmation signal at the time of normal operation. Further, the above-mentioned first computer comprises means for resetting the above-mentioned second computer in the case where the above-mentioned in-operation signal is not replied within a predetermined standby time period to the transmission of the above-mentioned operation confirmation signal, and reliably resets the second computer when the second unit is mounted.

Furthermore, according to the Japanese Patent Publication (unexamined) No. 108835/2002, the following on-vehicle electronic control unit is proposed. This on-vehicle electronic control unit comprises serial communication means capable of transferring a control constant at the time of starting the operation, and mutually communicating without restraint a variety of data during the operation, and carries out a sum check error and a retransmission processing with respect to a serial communication data, a timeout check error and a reset processing of a microprocessor, or an inhibition processing of a control output.

As for the rest, in association with this invention, according to the Japanese Patent Publication (unexamined) No. 235598/2002, the following vehicle control unit is supposed. This vehicle control unit includes error occurrence storage means for restarting a microprocessor after having assured safety when the microprocessor such as main CPU or sub CPU, which is contained in any on-vehicle electronic device, runs away. However, the one that is described in this publication does not relate to a communication control.

In the method and unit for detecting failure in a communication network that is described in the above-mentioned Japanese Patent Publication (unexamined) No. 219720/1997, a count value of data errors is reset at intervals of a predetermined time period.

Accordingly, a problem exists in that number of times of acceptable error left for the error determination changes suddenly before and after the reset, resulting in lack of sequential continuity. In addition, any timeout error processing or any retransmission processing is not described from a comprehensive standpoint.

Furthermore, according to a communication-monitoring unit described in the above-mentioned Japanese Patent Publication (unexamined) No. 162814/1997, there are the following problems.

A problem exists in that a response delay is generated in detection of the error occurrence after a normal communication has continuously been carried out in case of setting a threshold value for determining the error to be large; and another problem in that a too-sensitive error detection is carried out also with respect to slightly sporadic error occurrence in case of setting a threshold value for determining the error to be small.

In addition, as for the Japanese Patent Publication (unexamined) No. 219720/1997, any timeout error processing or any retransmission processing is not mentioned from a comprehensive standpoint.

Besides, according to an electronic device or a control method thereof that is described in the above-mentioned Japanese Patent Publication (unexamined) No. 267948/2000, a problem exists in that a computer is reset only with a single timeout. In addition, a sum check error processing or a retransmission processing is not described from a comprehensive standpoint.

Further, according to an on-vehicle electronic control unit that is described in the above-mentioned Japanese Patent Publication (unexamined) No. 108835/2002, there are the following problems. A problem exists in that a microprocessor is reset with just a single timeout, or an output inhibition processing is carried out resolutely; another problem in that number of times of retransmission corresponding to any sum check error is not defined reasonably.

Moreover, according to a vehicle control unit that is described in the above-mentioned Japanese Patent Publication (unexamined) No.235598/2002, a problem exists in that although a timeout of communication attributed to the run-away error of a microprocessor can be detected, a timeout of the communication due to any other cause cannot be detected.

SUMMARY OF THE INVENTION

The present invention was made to solve the problems as described above and to provide a highly safe and reliable electronic control unit (for example, on-vehicle electronic control unit). A first object of this invention is to provide a highly safe and reliable electronic control unit that is capable of avoiding too sensitive error determination with respect to a sporadic and chronic error in which an error state automatically recovers; and capable of executing a retransmission processing in accordance with a history state of the past with respect to any fatal and continuous failure, and thereafter defining an immediate error determination.

Furthermore, a second object of this invention is to provide a highly safe and reliable electronic control unit that is capable of restarting the device after having ensured the safety with respect to the occurrence of any communication error or any run-away error of a microprocessor.

An electronic control unit according to this invention is provided with: a first control circuit section containing a program memory including input/output control means and communication control means with respect to any external equipment, an operation processing RAM memory, a main CPU cooperating with the above-mentioned program memory, and a first series-parallel converter; and a second control circuit section containing a communication control circuit section for carrying out a communication of a monitoring and control signal, a data memory, and a second series-parallel converter. This electronic control unit is arranged such that serial communication of a monitoring and control signal is carried out mutually between the above-mentioned first control circuit section and the above-mentioned second control circuit section via the above-mentioned first series-parallel converter and second series-parallel converter.

In this electronic control unit, the above-mentioned first control circuit section includes first communication error determination means for determining presence or absence of any error of data having been received from the above-mentioned second control circuit section; first adding-subtracting means that subtracts or adds a first variation value when the above-mentioned first communication error determination means determines the absence of error, and adds or subtracts a second variation value when the above-mentioned first communication error determination means determines the presence of the error to carry out an addition and subtraction compensation so as to offset each other, and stops the addition and subtraction compensation with the above-mentioned first variation value at a predetermined normal-side limit value when the determination of the absence of error continues; and first error occurrence definition means for generating an error detection signal when a current value of the above-mentioned first adding-subtracting means exceeds a predetermined abnormal-side limit value as a result of an accumulation of the above-mentioned first and second variation values.

The above-mentioned second control circuit section comprises second communication error determination means for determining the presence or absence of any error of data having been received from the above-mentioned first control circuit section; second adding-subtracting means that subtracts or adds a first variation value when the above-mentioned second communication error determination means determines the absence of error, and adds or subtracts a second variation value when the above-mentioned second communication error determination means determines the presence of the error to carry out an addition and subtraction compensation with respect to a current value so as to offset each other, and stops the addition and subtraction compensation with the above-mentioned first variation value at a predetermined normal-side limit value when the determination of the absence of error continues; and second error occurrence definition means for generating an error detection signal when a current value of the above-mentioned second adding-subtracting means exceeds a predetermined abnormal-side limit value as a result of an accumulation of the above-mentioned first and second variation values.

The above-mentioned second variation value is set to be a value larger than the above-mentioned first variation value and smaller than an permitted accumulation value that is a difference between the above-mentioned abnormal-side limit value and the above-mentioned normal-side limit value. Operation stop or initiation restart of the above-mentioned first control circuit section or the above-mentioned second control circuit section is carried out in response to an error detection signal generated by the above-mentioned first error occurrence definition means or second error occurrence definition means.

As a result, according to this electronic control unit of the invention, since too sensitive error determination is not carried out with respect to a sporadic and chronic error, error occurrence definition is carried out even if a permitted accumulation value is set to be a large value. In this error occurrence definition, once any fatal and continuous failure occurs, a current value of the adding-subtracting means immediately comes to be out of the scope of an abnormal-side limit value with the second variation value that is larger than the first variation value, resulting in the definition of error occurrence. Consequently, it is possible to provide a highly safe and reliable electronic control unit.

Another electronic control unit according to this invention is provided with: a first control circuit section containing a program memory including input/output control means and communication control means with respect to any external equipment, an operation processing RAM memory, a main CPU cooperating with the above-mentioned program memory, a direct input/output interface circuit, and a first series-parallel converter; and a second control circuit section containing a communication control circuit section for carrying out communication of a monitoring and control signal, a data memory, and a second series-parallel converter.

This electronic control unit is arranged such that serial communication of a monitoring and control signal is carried out mutually between the above-mentioned first control circuit section and second control circuit section via the above-mentioned first series-parallel converter and second series-parallel converter.

In this electronic control unit, the above-mentioned main CPU is arranged to generate an output signal in response to a direct input signal having been inputted via the above-mentioned direct input signal interface circuit, an indirect input signal having been received by a serial communication from the second series-parallel converter, which is provided in the above-mentioned second control circuit section, and a content of the above-mentioned program memory to drive an electrical load group connected to the above-mentioned direct output signal interface circuit; and to transmit an indirect output signal to the second control circuit section via the above-mentioned first and second series-parallel converters.

In this electronic control unit, the above-mentioned first control circuit section includes first receiving interval error determination means for determining that receiving interval of a communication data to be regularly reported from the above-mentioned second control circuit section exceeds a first threshold value, and generating a first error detection signal.

The above-mentioned second control circuit section includes second receiving interval error determination means for determining that receiving interval of a communication data to be regularly transmitted from the above-mentioned first control circuit section exceeds a second threshold value, and generating a second error detection signal.

Further, one of the above-mentioned first control circuit section and the above-mentioned second control circuit section includes a watchdog timer that watches a watchdog clear signal, which the above-mentioned main CPU generates, and generates a reset pulse signal when a pulse width of the above-mentioned watchdog clear signal exceeds a predetermines limit value, being a value smaller than the above-mentioned second threshold value; and error occurrence storage means that stores an error detection signal or a reset pulse signal, and brings annunciation means such as alarm, display, printing, and history save in operation when the above-mentioned first and second error detection signal is generated, or when the above-mentioned watchdog timer generates a reset pulse signal.

Furthermore, the above-mentioned main CPU is initialized and restarted when the above-mentioned watchdog timer generates a reset pulse signal, or when the above-mentioned second error detection signal is generated; and a communication control circuit section of the above-mentioned second control circuit section is initialized and restarted when the above-mentioned watchdog timer generates a reset pulse signal, or the above-mentioned first error detection signal is generated.

As a result, according to this above-mentioned electronic control unit of the invention, it is possible to restart the main CPU without depending on any communication line where the error occurs. In addition, at the time of occurrence of any run-away error of the main CPU, the initialization of the first control circuit section is immediately carried out, being free from waiting for the determination of the second receiving interval error determination means, thereby enabling to carry out a safe restart.

Further, even in the case where any error is due to temporary noise malfunction of the main CPU and the main CPU 110*b* is caused to immediately restart in normal way, the fact of the error occurrence is defined and confirmed, thereby enabling to induce the maintenance inspection.

That is, it is possible to provide a highly safe and reliable on-vehicle electronic control unit that is capable of restarting the device after having ensured the safety with respect to the occurrence of a communication error between the first control circuit section ant the second control circuit section or the run-away error of a microprocessor.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a diagram showing a control output and constant set data table in the electronic control unit according to the second embodiment.

FIG. 13 is a diagram showing a monitoring input data table in the electronic control unit according to the second embodiment.

DESCRIPTION OF THE PREFERRED EMBODIMENTS

Figure 1:
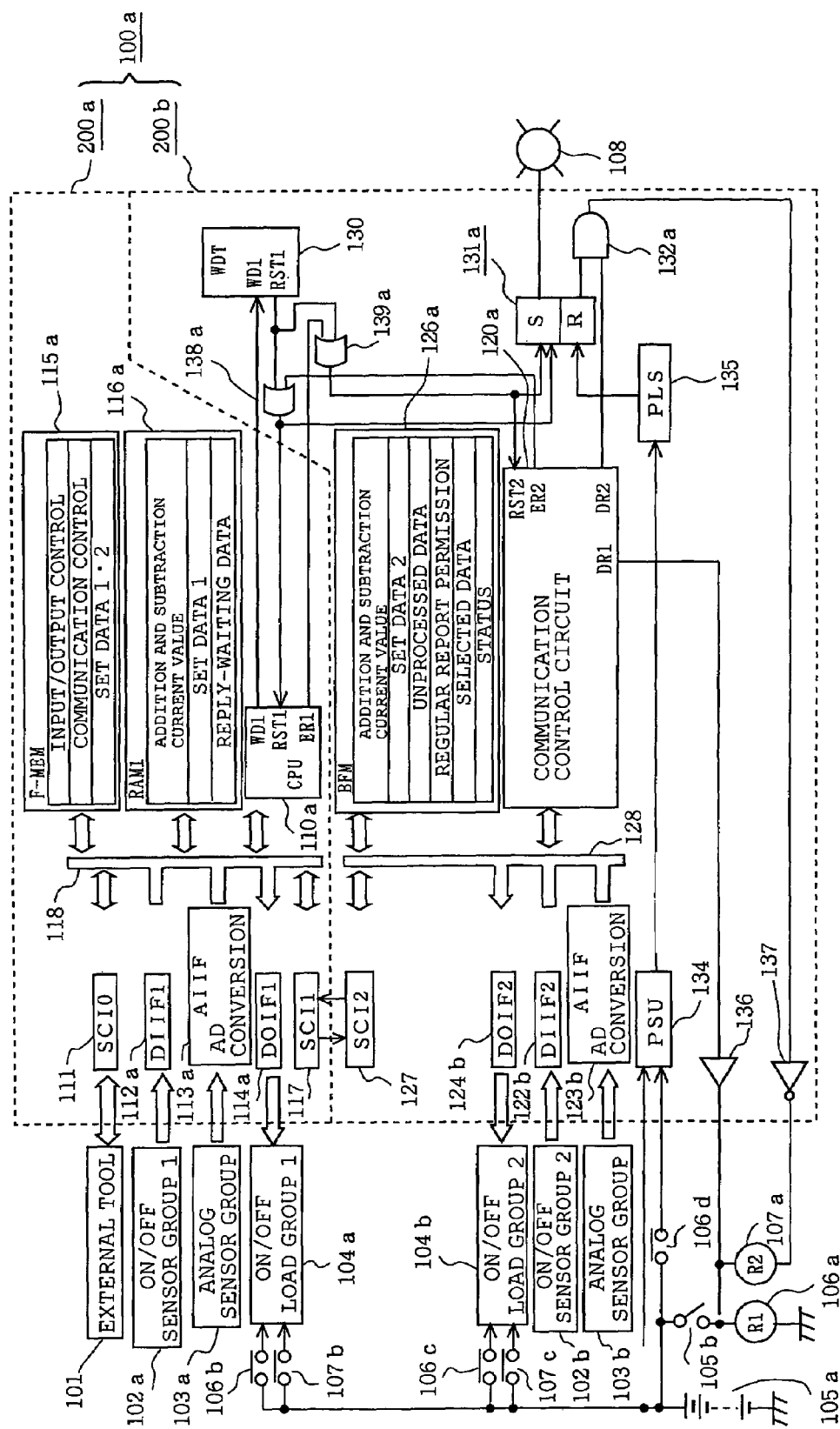
FIG. 1 is a block diagram showing an entire constitution of an electronic control unit according to a first preferred embodiment.

Several preferred embodiments according to the present invention are described referring to the drawings.

In the drawings, like reference numerals designate the same or like parts.

Embodiment 1

FIG. 1 is a block diagram showing an entire constitution of an electronic control unit according to a first embodiment.

With reference to FIG. 1, reference numeral 100*a* designates an electronic control unit consisting of a first control circuit section 200*a* and a second control circuit section 200*b*.

First, as a component connected to the outside of the above-mentioned electronic control unit 100*a*, numeral 101 designates an external tool. This external tool 101 is connected via a detachable connector, not shown, to the above-mentioned electronic control unit 100*a* at the time of dispatching a product or maintenance inspection thereof, and functions to transfer and write a control program or a control constant to the later-described non-volatile program memory 115*a*.

Numeral 102*a* designates a first input sensor group (for example, an engine speed sensor, a crank angle sensor, and a speed sensor) that performs an ON/OFF operation. This first input sensor group 102*a* performs a relatively high-speed and high-frequency operation, and serves as a sensor group the input of which needs to be directly fetched into the later-described main CPU 110*a*.

Numeral 102*b* designates a second input sensor group that performs an ON/OFF operation (for example, a selected position sensor of a transmission shift lever, an air-conditioner switch, an idle-position detecting switch of an accelerator pedal, a power steering operation switch, and a break switch). This second input sensor group 102*b* performs a relatively low-frequency operation, and serves as a sensor group in which delay in fetching signals does not matter much.

Numeral 103*a* designates a first analog sensor group (for example, an airflow sensor measuring an air-intake of a throttle, an accelerator position sensor measuring a depression degree of the accelerator pedal, and a throttle position sensor measuring an opening of a throttle valve). This first analog sensor group 103*a* performs an output change the degree of which is relatively sharp, and serves as a sensor group the signals of which need to be directly fetched into the later-described main CPU 110*a*.

Numeral 103*b* designates a second analog sensor group (for example, a coolant temperature sensor, an intake-air temperature, and an atmospheric pressure sensor). This second analog sensor group 103*b* performs a relatively slow output change, and serves as a sensor group in which delay in fetching signals does not matter much.

Numeral 104*a* designates a first electrical load group (for example, a fuel injection solenoid valve, an ignition coil, and an open/close controlling motor of an intake-air throttle). This first electrical load group 104*b* performs a relatively high-frequency operation, and serves as an electrical load group of an ON/OFF operation that needs to generate a drive output without delay.

Numeral 104*b* designates a second electrical load group (for example, an air-conditioner driving electromagnetic clutch or a transmission stage shifting solenoid valve of the transmission). This second electrical load group 104*b* performs a relatively low-frequency operation, and serves as an electrical load group of an ON/OFF operation in which response delay in drive output does not matter much.

Numeral 105*a* designates an external power supply feeding an electric power to the above-mentioned electronic control unit 100*a* or the first and second electrical load groups 104*a* and 104*b*. Numeral 105*b* designates a power supply switch. Numeral 106*a* designates a power supply relay including output contacts 106*b*, 106*c* and 106*d*. Numeral 107*a* designates a load power supply relay including output contacts 107*b* and 107*c*. The above-mentioned power supply relay 106*a* is energized from the above-mentioned external power supply 105*a* via the above-mentioned power supply switch 105*b*, and closes a power supply circuit to the above-mentioned first and second electrical load groups 104*a* and 104*b* with the output contacts 106*b* and 106*c*. Further, the above-mentioned power supply relay 106*a* closes a power feed circuit from the above-mentioned external power supply 105*a* to the electronic control unit 100*a* with the output contact 106*d*.

Furthermore, the above-mentioned external power supply 105*a* and electronic control unit 100*a* includes a direct connection circuit so that the electromagnetic control unit 100*a* may be fed with an electric power in sleep mode even when the above-mentioned power supply switch 105*b* is open.

In this respect, even in the state that the operation of the microprocessor is stopped and the electromagnetic control unit is not operated, feeding a small amount of electric power continues in order to maintain a part (or all) of a storage state of the later-described RAM memory 116*a*. Such a power feed state is referred to as power feed in sleep mode.

Further, a part of the above-mentioned first and second electrical load groups 104*a* and 104*b* are arranged so that a power supply circuit may be closed via the output contacts 107*b* and 107*c* of the above-mentioned load power supply relay 107*a*.

Numeral 108 designates an alarm and display (annunciation means), which is driven from the above-mentioned electronic control unit 10*a* and mounted at such a position where any observer can easily watch.

Now, internal constitution of the first control circuit section 200*a* is described.

Numeral 110*a* designates a main CPU, being a microprocessor, for example, of 32 bits. Numeral 111 designates a serial interface that is serially connected to the above-mentioned external tool 101. Numeral 112*a* designates a direct input signal interface circuit that is connected in parallel to the above-mentioned first input sensor group 102*a*. Numeral 113*a* designates a first multi-channel AD converter that is connected to the above-mentioned first analog sensor group 103*a*. Numeral 114*a* designates a direct output signal interface circuit that is connected in parallel to the above-mentioned first electrical load group 104*a*. Numeral 115*a* designates a non-volatile program memory such as flash memory. Numeral 116*a* designates a RAM memory for operation processing. Numeral 117 designates a first series-parallel converter that is provided in the first control circuit section 200*a*. Numeral 118 designates a data bus.

The above-mentioned serial interface 111, first series-parallel converter 117, first multi-channel AD converter 113*a*, direct input signal interface circuit 112*a*, direct output signal interface circuit 114*a*, program memory 115*a*, RAM memory 116*a* and main CPU 110*a* are mutually connected through the above-mentioned data bus 118. The one that is specified by means of an address bus or a chip select circuit, not shown, communicates with the above-mentioned CPU 110a.

Furthermore, written in the above-mentioned program memory 115a are a program acting as input/output control means or a program acting as communication control means, and a set data to be transferred and written in the later-described first and second set data memories 237a and 237b (refer to FIG. 2).

Additionally, in the above-mentioned RAM memory 116a, written are a current value data of the later-described first adding-subtracting means 230a (refer to FIG. 2), a fist set data having been transferred from the above-mentioned program memory 115a, or the later-described reply waiting command data.

Now, internal constitution of the second control circuit section 200b is described.

Numeral 120a describes an associative control circuit section the main component of which is the later-described communication control circuit section (it is also referred to as communication control circuit section). Numeral 122b designates an indirect input signal interface circuit that is connected in parallel to the above-mentioned second input sensor group 102b. Numeral 123b designates a second multi-channel AD converter that is connected to the above-mentioned second analog sensor group 103b. Numeral 124b designates an indirect output signal interface circuit that is connected in parallel to the above-mentioned second electrical load group 104b. Numeral 126b designates a data memory to be connected to the later-described data bus 128 with a chip select signal not shown. Numeral 127 designates a second series-parallel converter that is serially connected to the above-mentioned series-parallel converter 117 provided in the first control circuit section 200a. Numeral 128 designates a data bus.

The above-mentioned second series-parallel converter 127, indirect input signal interface circuit 122b, indirect output signal interface circuit 124b, second multi-channel AD converter 123b, data memory 126a and associative control circuit section 120a are mutually connected through the above-mentioned data bus 128.

Herein, the indirect input signal or the indirect output signal is an input/output signal to be communicated with the microprocessor 110a acting as a main CPU or a microprocessor 10b to be described later in a second embodiment by a serial communication via the first series-parallel converter 117 and the second series-parallel converter 127. Whereas, the direct input signal or the direct output signal is an input/output signal to be directly connected to the microprocessor 110a acting as a main CPU or the microprocessor 110b without the first series-parallel converter 117 and the second series-parallel converter 127.

In addition, the electronic control unit according to this first embodiment is constituted so as to divide into two parts of the first control circuit section 200a and the second control circuit section 200b via a serial communication section (first and second series-parallel converters). Further, the first control circuit section 200a uses the second control circuit section 200b in combination, and there is provided the associative control circuit section 120a as a central part of the second control circuit section 200b to be used in combination.

The main component of the associative control circuit section 120a is a communication control circuit so that numeral 120a is hereinafter referred to as a communication control circuit section.

Further, written in the above-mentioned data memory 126a are a current value data of the later-described second adding-subtracting means 230b (refer to FIG. 2), a second set data having been transferred from the above-mentioned program memory 115a, or the later-described unprocessed command data, as well as a regular report permission command data, a selected data, a status information and the like.

Numeral 130 designates a watchdog timer. This watchdog timer 130 monitors a watchdog clear signal WD1, being a pulse train that the above-mentioned main CPU of the first control circuit section 200a generates, and generates a reset pulse signal RST1 to cause the above-mentioned main CPU 110a to restart when a pulse width of the foregoing watchdog clear signal WD1 exceeds a predetermined value.

Further, the above-mentioned main CPU 110a generates the later-described first error detection signal ER1.

In addition, the above-mentioned communication control circuit section (associative control circuit section) 120a generates the later-described second error detection signal ER2, or a drive output DR1 to the above-mentioned power supply relay 106a and a drive output DR2 to the above-mentioned load power supply relay 107a.

Numeral 131a designates an error storage circuit (error occurrence storage means) constituted of a flip-flop circuit that includes a set input S and a reset input R. This error storage circuit (error occurrence storage means) 131a stores the operation of the above-mentioned reset pulse signal RST1 or first and second error detection signals ER1 and ER2, and drives the above-mentioned alarm and display (annunciation means) 108.

Numeral 132a designates a gate circuit (drive stop means). Numeral 134 designates a power supply unit. Numeral 135 designates a power supply detection circuit. Numeral 136 designates a drive element. Numeral 137 designates an inverting drive element. The above-mentioned power supply unit 134 is directly fed with an electric power from the above-mentioned external power supply 105a or fed with power via the output contact 106d of the above-mentioned power supply relay 106a, and generates a stabilizing control power supply output to be used in the above-mentioned electronic control unit 100a.

Further, the above-mentioned power supply detection circuit 135 detects the fact that the above-mentioned power supply switch 105b is closed, and resets the above-mentioned error storage circuit (error occurrence storage means) 131a to initialize it.

The above-mentioned drive element 136 drives the above-mentioned power supply relay 106a with the above-mentioned drive output DR1, and continues to hold the operation of the power supply relay 106a until the drive output DR1 is stopped outputting even if the above-mentioned power supply switch 105b is closed.

The above-mentioned inverting drive element 137 drives the above-mentioned load power supply relay 107a from the terminal of the above-mentioned drive output DR2 via the above-mentioned drive stop means 132a. Further, the foregoing load power supply relay 107a operates when the drive output DR2 is generated and the error storage circuit 131a stores no error.

In addition, it is arranged such that the above-mentioned load power supply relay 107a is de-energized upon de-energization of the above-mentioned power supply relay 106a; while only the load power supply relay 107a is de-energized even if the power-supply relay 106a is energized, thereby enabling to stop the power feed with respect to a part of electrical loads.

Numeral 138a designates an OR element the inputs of which are the above-mentioned reset pulse signal RST1 and second error detection signal ER2. The outputs from the foregoing OR element 138a are connected to a reset input terminal RST1 of the above-mentioned main CPU 110a and a set input terminal of the above-mentioned error storage circuit 131a.

Numeral 139a designates an OR element the inputs of which are the above-mentioned reset pulse signal RST1 and first error detection signal ER1. The outputs from the foregoing OR element 139a are connected to a reset input terminal RST2 of the above-mentioned associative control circuit section 120a and a set input terminal of the above-mentioned error storage circuit 131a.

Now, operations of a communication control in the electronic control unit according to this first embodiment are described.

Figure 2:
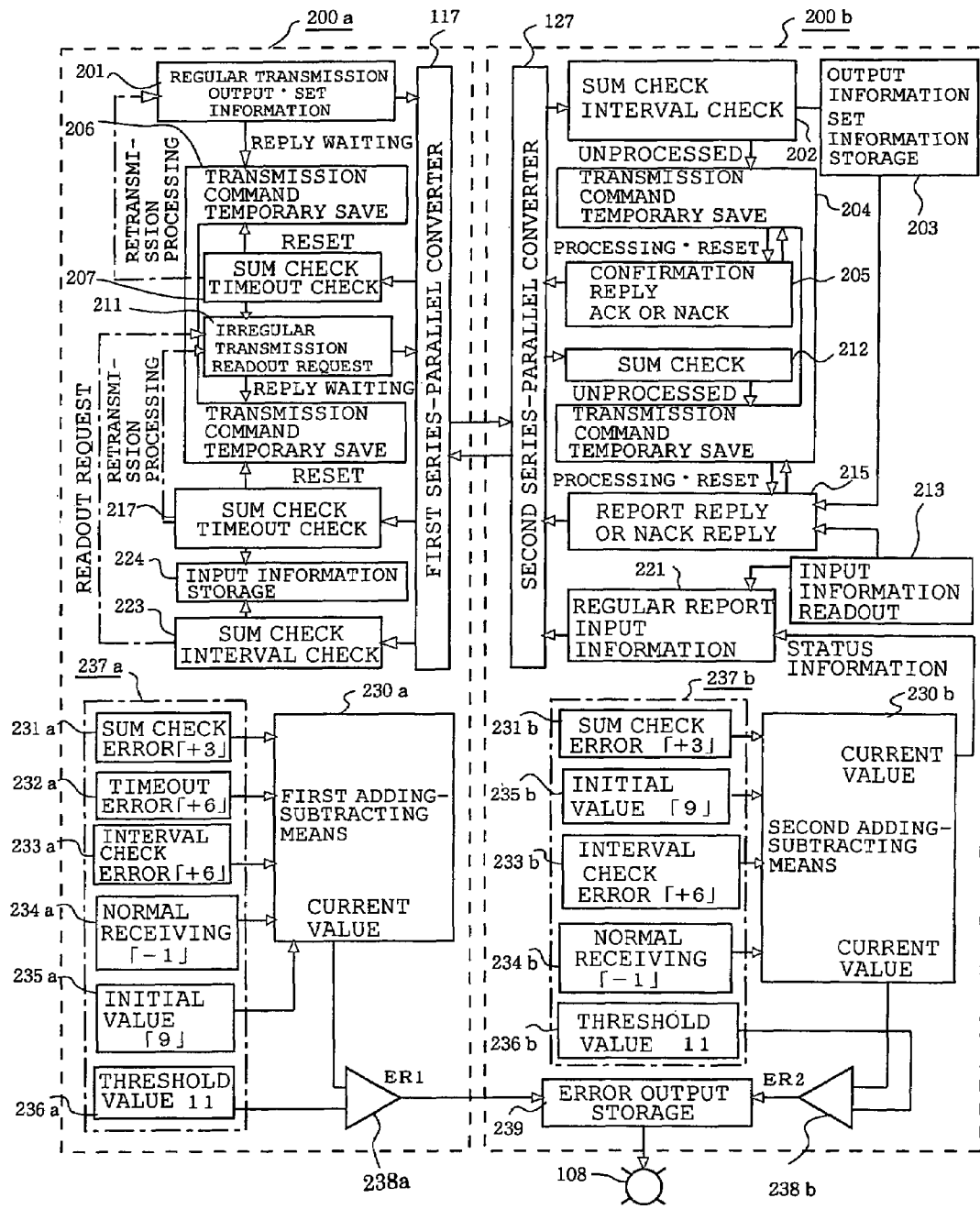
FIG. 2 is a block diagram for explaining a communication control operation of the electronic control unit according to the first embodiment.

FIG. 2 is a block diagram for explaining a communication control operation of the electronic control unit according to the first embodiment shown in FIG. 1.

With reference to FIG. 2, signals to be exchanged between the first control circuit section 200a including the first series-parallel converter 117 (hereinafter, also referred to as a master station) and the second control circuit section 200b including the second series-parallel converter 127 (hereinafter, also referred to as a sub station) are classified roughly as follows.

Numeral 201 designates a regular transmission packet that is prepared at the master station and transmitted to the sub station. Numeral 202 designates a determination block that is executed on the side of the sub station (second control circuit section 200b) having received the foregoing regular transmission packet 201 and acts as a part of second communication error determination means. Numeral 203 designates an output information storage block that stores a regular transmission data having been normally received via the foregoing determination block 202. Numeral 204 designates an unprocessed data table that sequentially stores a normal receiving ACK or a receiving failure NACK as a reply command data responsive to the transmission from the master station to the sub station. Numeral 205 designates a confirmation reply packet to be replied from the sub station to the master station.

The above-mentioned confirmation reply packet 205 corresponds to a leading reply command data having been stored at the earliest time and remained in the above-mentioned unprocessed data table 204. A leading reply command data in the above-mentioned unprocessed data table 204 is deleted, accompanied by the transmission of the confirmation reply packet 205.

In this respect, data to be transmitted with the above-mentioned regular transmission packet 201 include direct output information that is output to the second electrical load group 104b of FIG. 1, various set constants to be transmitted to the later-described second set data memory 237b, and the like.

Numeral 206 designates a reply waiting data table that sequentially stores transmission command data when the above-mentioned regular transmission packet 201 is transmitted on the master station side. Numeral 207 designates a determination block that is executed on the side of the master station (the first control circuit section 200a) having received a reply data from the sub station and acts as a part of first communication error determination means. When the foregoing determination block 207 determines that it is a normal receiving, a leading command data having been stored in the above-mentioned reply waiting data table 206 is deleted.

Further, when the above-mentioned determination block 207 normally receives the receiving failure data NACK or when the determination block 207 carries out the determination of the receiving error with respect to a reply data, a retransmission processing is carried out with the above-mentioned regular transmission packet 201. This retransmission processing causes an old saved data in the above-mentioned reply waiting data table 206 to be deleted and causes a transmission command data having been retransmitted is newly stored.

Numeral 211 designates an irregular transmission packet to be transmitted from the master station to the sub station when the master station executes a readout request to the sub station. Numeral 212 designates a determination block that is executed on the side of the sub station having received the foregoing irregular transmission packet 211 and acts as a part of second communication error determination means. In the above-mentioned unprocessed data table 204, stored together with a replying command are the receiving failure NACK or an address of reply information necessary to be reported and replied as a determination result of the above-mentioned determination block 212.

Numeral 213 designates an input information readout block for reading out input information on the sub station side. Numeral 215 designates a report reply packet to be replied from the sub station to the master station.

The foregoing report reply packet 215 corresponds to a leading reply command data having been stored at the earliest time and remained in the above-mentioned unprocessed data table 204. The leading reply command data in the above-mentioned unprocessed data table 204 is deleted, accompanied by the transmission of the report reply packet 215.

In addition, a reply command data corresponding to the above-mentioned regular transmission packet 201 and a reply command data corresponding to the above-mentioned irregular transmission packet 211 are synthesized and stored in order of generation in the above-mentioned unprocessed data table 204. Further, replying these data are executed in sequence in which the older ones are fetched out first on the basis of first-in first-out.

Likewise, when the above-mentioned regular transmission packet 201 or irregular transmission packet 211 are transmitted, transmission command data are sequentially stored in the above-mentioned reply-waiting data table 206.

Numeral 217 designates a determination block that is executed on the master station side having received a reply data from the sub station and acts as a part of first communication error determination means. When the foregoing determination block 217 determines the normal receiving, a leading command data, which is stored in the above-mentioned reply waiting data table 206, is deleted. In addition, input information relative to an address that is specified with the above-mentioned report reply packet 215 is stored and saved by the later-described input information storage block 224.

When the above-mentioned determination block 217 normally receives a receiving failure data NACK of the sub station side or the determination block 217 determines the receiving error relative to a reply data, the retransmission processing is carried out with the above-mentioned irregular transmission packet 211. Further, this retransmission processing causes an old saved data in the above-mentioned reply waiting data table 206 to be deleted and causes a transmission command data having been retransmitted to be newly stored.

Numeral 221 designates a regular report packet for the purpose of regularly transmitting input information on the sub station side to the master station. Numeral 223 designates a determination block that is executed on the master station side having received a regular report data from the sub station (specifically, data that is regularly transmitted from the sub station with a regular report packet 221) and acts as a part of first communication error determination means. Numeral 224 designates an input information storage block that stores the above-mentioned regular report data when the above-mentioned determination block 223 determines that it is a normal receiving.

Further, it is arranged such that when the above-mentioned determination block 223 determines the receiving error relative to a regular report data, a readout request can be made with the above-mentioned irregular transmission packet 211.

Furthermore, data to be transmitted with the above-mentioned regular report packet 221 or report reply packet 215 are indirect input signals provided by the second input sensor group 102*b* or the second analog sensor group 103*b* of FIG. 1. Additionally, in the case of the report reply packet 215, output and set information having been written and set already with a regular transmission packet 201 is also the target for replying.

First communication error determination means in the above-mentioned determination blocks 207, 217, 223 includes bit error determination means for determining the presence or absence of any lack and mix in bit information such as parity check or sum check relative to a serial data having been replied or reported from the sub station to the master station.

Further, the first communication error determination means in the above-mentioned determination blocks 207 and 217 includes reply response error determination means that carries out an error determination when a save time period of the oldest transmission command data remained in the above-mentioned reply waiting data table 206 exceeds a predetermined reply response time period.

In addition, the first communication error determination means in the above-mentioned determination block 223 includes receiving interval error determination means that carries out the error determination when a receiving interval time period of the master station with respect to a regular report data, which the sub station transmits, exceeds a predetermined value.

Likewise, second communication error determination means in the above-mentioned determination blocks 202 and 212 includes bit error determination means for determining the presence or absence of any lack and mix in bit information such as parity check or sum check with respect to a serial data having been transmitted from the master station to the sub station.

Further, the second communication error determination means in the above-mentioned determination block 202 includes receiving interval error determination means that carries out the error determination when a receiving interval time period of the sub station with respect to a regular transmission data, which the master station transmits, exceeds a predetermined value.

Numeral 230*a* designates first adding-subtracting means, which is constituted of, for example, a reversible counter, and initial value of which is set to 9 and the current value of which is restricted so as not to be less than 0. Numeral 231*a* designates a storage memory of a second variation value that acts when any bit error is determined in the above-mentioned determination blocks 207, 217 and 223, and adds a variation value 3 with respect to the above-mentioned first adding-subtracting means 230*a*.

Further, numeral 232*a* designates a storage memory of a third variation value that acts when a reply response error determination is made in the above-mentioned determination blocks 207 and 217, and adds a variation value 6 with respect to the above-mentioned first adding-subtracting means 230*a*. Numeral 233*a* designates a storage memory of a third variation value that acts when a receiving interval error determination is made in the above-mentioned determination block 223, and adds a variation value 6 with respect to the above-mentioned first adding-subtracting means 230*a*.

furthermore, numeral 234*a* designates a storage memory of a first variation value that acts when all of the above-mentioned determination blocks 207, 217 and 223 determine that it is normal, and subtracts a variation value 1 with respect to the above-mentioned first adding-subtracting means 230*a*. Numeral 235*a* designates a storage memory of an initial value to be initialized in a current value memory of the above-mentioned first adding-subtracting means 230*a*. Numeral 236*a* designates a storage memory of a determination threshold in which, for example, the value of 11 is used. Numeral 237*a* designates a first set data memory including the above-mentioned storage memories 231*a*-236*a*.

Numeral 238*a* designates first error occurrence definition means. This first error occurrence definition means 238*a* generates a first error detection signal ER1 when a current value of the above-mentioned first adding-subtracting means 230*a* exceeds a value of the determination threshold "11" that is stored in the above-mentioned storage memory.

Numeral 230*b* designates second adding-subtracting means, which is constituted of, for example, a reversible counter, an initial value of which is set to 9, and a current value of which is restricted so as not to be less than 0. Numeral 231*b* designates a storage memory of a second variation value that acts when a bit error is determined in the above-mentioned determination blocks 202 and 212, and adds a variation value 3 with respect to the above-mentioned second adding-subtracting means 230*b*.

Further, numeral 233*b* designates a storage memory of a third variation value that acts when a receiving interval error determination is made in the above-mentioned determination block 202, and adds a variation value 6 with respect to the above-mentioned second adding-subtracting means 230*b*. Numeral 234*b* designates a storage memory of a first variation value that acts when both of the above-mentioned determination blocks 202 and 212 determine that it is normal, and subtracts a variation value 1 with respect to the above-mentioned second adding-subtracting means 230*b*.

Further, numeral 235*b* designates a storage memory of an initial value to be initialized in a current value memory of the above-mentioned second adding-subtracting means 230*b*. Numeral 236*b* designates a storage memory of a determination threshold in which, for example, a value of 11 is used. Numeral 237*b* a second set data memory including the above-mentioned storage memories 231*b*-236*b*.

Furthermore, numeral 238*b* designates second error occurrence definition means. This second error occurrence definition means 238*b* generates a second error detection signal ER2 when a current value of the above-mentioned second adding-subtracting means 230*b* exceeds a value of the determination threshold "11" that is stored in the above-mentioned storage memory 236b.

Numeral 239 designates error occurrence storage means for storing the operation of the above-mentioned first and second error detection signals ER1 and ER2. The above-mentioned alarm and display (annunciation means) 108 operates in response to an error storage signal provided by the foregoing error occurrence storage means 239.

Figure 3:
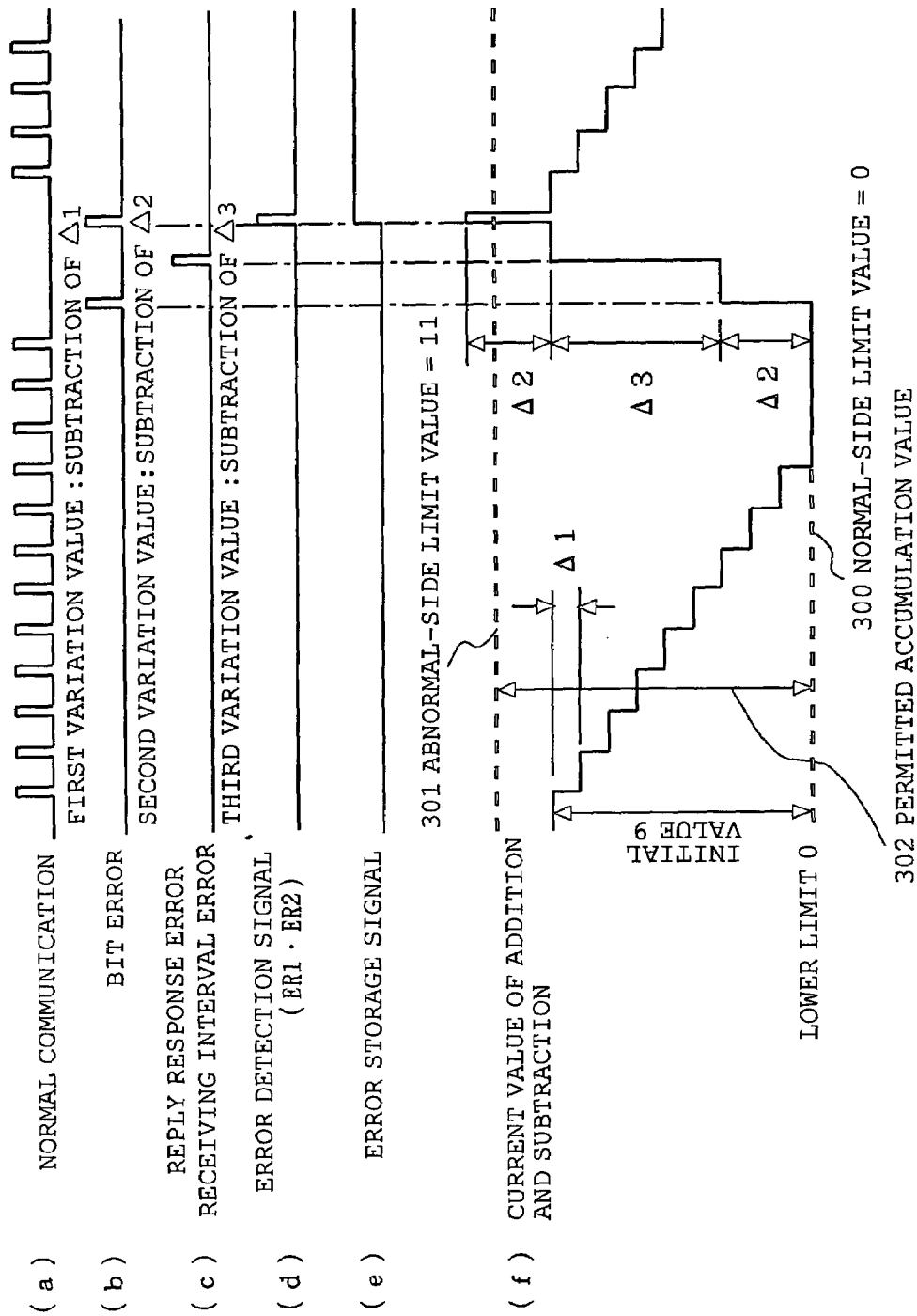
FIG. 3 is a chart for explaining the operation of a first and second adding-subtracting means of the electronic control unit according to the first embodiment.

FIG. 3 is a chart for explaining operations of the above-mentioned first adding-subtracting means 230a and second adding-subtracting means 230b.

With reference to FIG. 3, FIG. 3(a) indicates a normal receiving signal generated when communication error determination means determines the normal receiving. FIG. 3(b) indicates an abnormal receiving signal generated when the communication error determination means makes a bit error determination. FIG. 3(c) indicates an abnormal receiving signal generated when the communication error determination means makes a reply response error determination or a receiving interval error determination. FIG. 3(d) indicates the first and second error detection signals ER1 and ER2 that the first and second error occurrence definition means 283a and 283b generate. FIG. 3(e) indicates an error storage signal that error generation storage means 239 generates. FIG. 3(f) indicates a characteristic diagram showing the change in current value of the first and second adding-subtracting means 230a and 230b.

Furthermore, with reference to FIG. 3(f), numeral 300 designates a normal side limit value of a current value (lower limit=0). Numeral 301 designates an abnormal side limit value of a current value (upper limit=11). Numeral 302 designates an acceptable accumulation value (11-0=11) corresponding to a deviation between the above-mentioned abnormal side limit value 301 and normal side limit value 300.

Although an initial value of a current value of the first and second adding-subtracting means 230a and 230b is "9", subtraction of the first variation value Δ1="1" is carried out upon generation of a normal receiving signal, shown in FIG. 3(a). This subtraction results in decrease in current value. When a current value reaches a normal side limit value "0", the subtraction is limited so as not to be subtracted exceeding the normal side limit value "0".

When any abnormal receiving signal accompanied by the bit error, shown in FIG. 3(b), is generated, the addition of the second variation value Δ2="3" is carried out. When any abnormal receiving signal accompanied by the reply response error or the receiving interval error, shown in FIG. 3(c), is generated, the addition of the third variation value Δ3="6" is carried out.

As a result, when any addition value of cancellation (including counteraction) with the above-mentioned first variation value and the above-mentioned second and third variation values, exceeds the abnormal side limit value 11, error detection signals ER1 and ER2 of FIG. 3(d) are generated.

Furthermore, when an error detection signal ER1 or ER2 is generated, a current value of the first and second adding-subtracting means 230a and 230b are reset to the initial value "9".

Figure 4:
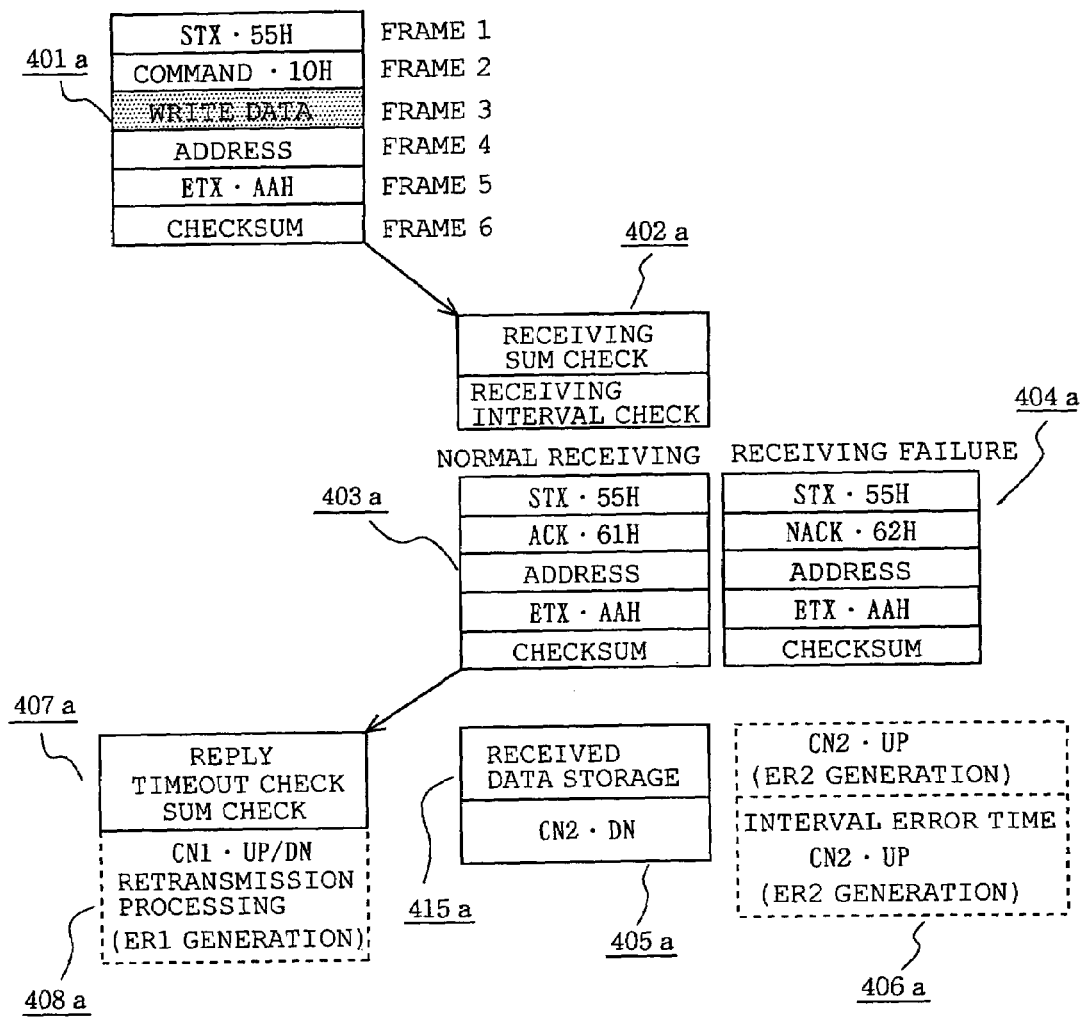
FIG. 4 is a diagram showing the constitution of a regular transmission packet of the electronic control unit according to the first embodiment.
Figure 5:
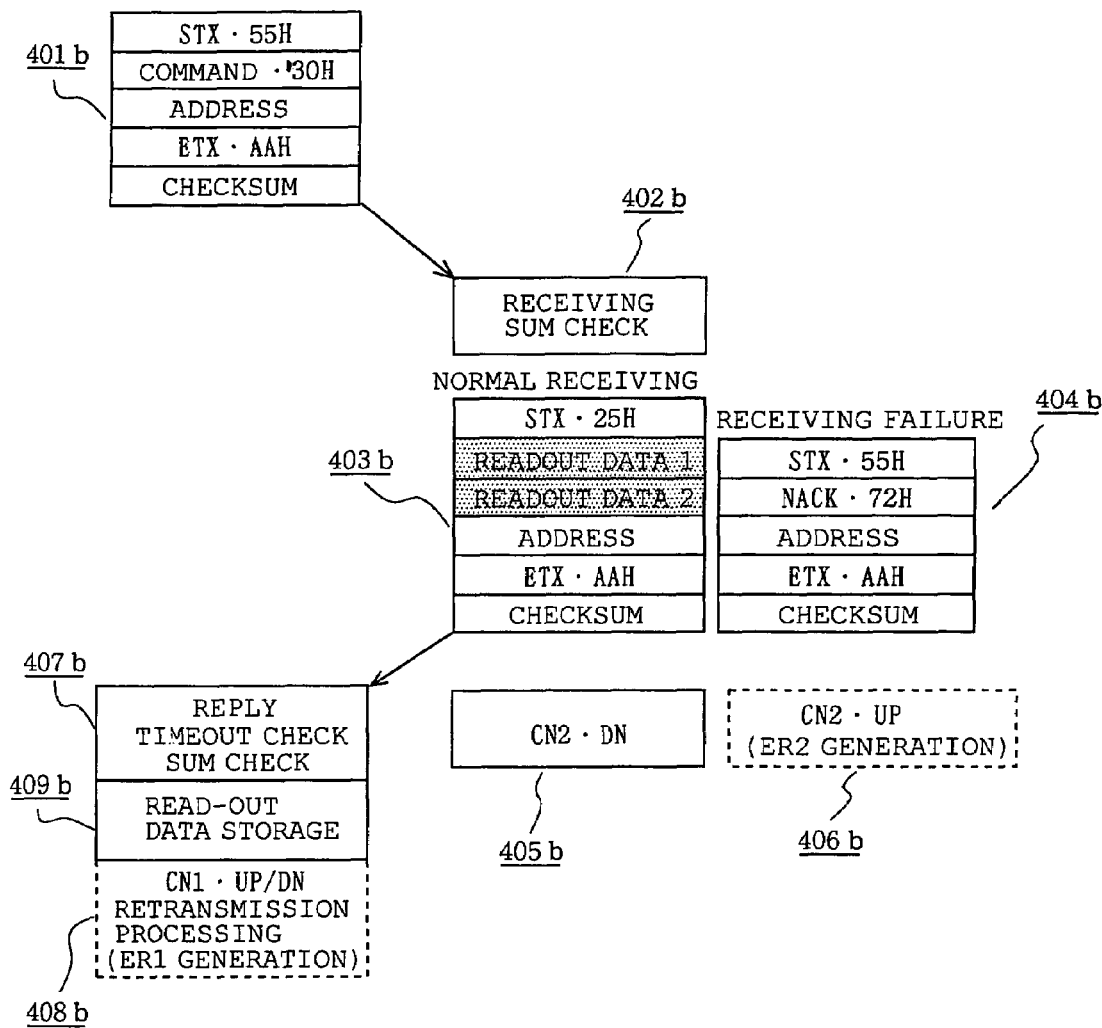
FIG. 5 is a diagram showing the constitution of an irregular transmission packet of the electronic control unit according to the first embodiment.
Figure 6:
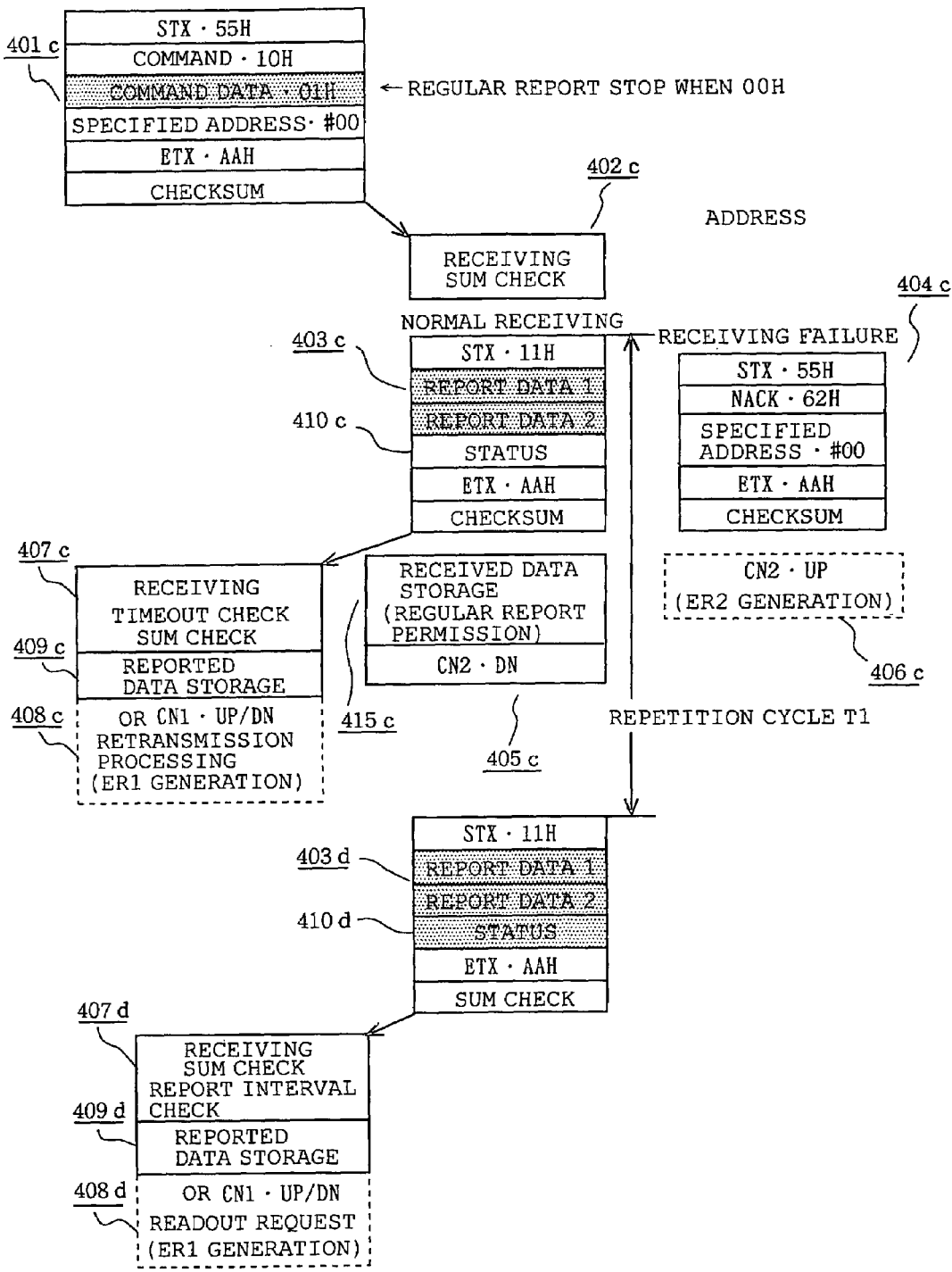
FIG. 6 is a diagram showing the constitution of a regular report packet of the electronic control unit according to the first embodiment.

FIGS. 4 to 6 show a packet constitution of a serial communication in the electronic control unit according to the first embodiment shown in FIG. 1. FIG. 4 shows a packet constitution of a regular transmission packet 401a. FIG. 5 shows a packet constitution of an irregular transmission packet 401b. FIG. 6 shows a packet constitution of regular report packets 403c and 403d.

With reference to FIGS. 4 to 6, a serial data to be communicated between the first series-parallel converter 117 and the second series-parallel converter 127 consists of 11 bits of data in total including a net data of 8 bits per one frame, a start bit, a stop bit, and a parity bit that are added at the series-parallel converter on the transmission side. On the receiving side, a parity check is carried out. In the case of presence of any error, the received data is discarded; while in the case of absence of error, only 8 bits of net data is extracted.

Further, 8 bits of data, described hereinafter, is given in hexadecimal numerals, and this hexadecimal is shown by a code H.

FIG. 4 shows the constitution of a regular transmission packet and a confirmation reply packet in the case where any indirect output signal is transmitted, or any set constant is transmitted to the second set data memory 237b from the first control circuit section 200a (master station) to the second control circuit section 200b (sub station).

With reference to FIG. 4, numeral 401a designates a regular transmission packet acting as regular transmission means from the master station to the sub station (corresponding to a regular transmission packet 201 of FIG. 2). The foregoing regular transmission packet 401a consists of frames 1 to 6, being a start data 55H, a command 10H, a write data, a storage location address, an end data AAH and a checksum data.

Numeral 402a designates a second communication error determination block (corresponding to the determination block 202 of FIG. 2) that acts when the sub station receives a series of data with the above-mentioned regular transmission packet 401a, and executes a bit error determination for detecting the presence or absence of any lack and mix of bits by the parity check or the sum check, or executes the receiving interval error determination of whether or not any normal receiving interval of the above-mentioned regular transmission packet 401a exceeds a predetermined time period.

Numeral 403a designates a confirmation reply packet of a normal receiving (ACK) to be replied to the master station when the determination of the above-mentioned second communication error determination block 402a is the normal receiving (corresponding to the confirmation reply packet 205 of FIG. 2). The foregoing confirmation reply packet consists of five frames of a start data 55H, an acknowledged data 61H, a storage location address, an end data AAH and a checksum data.

Numeral 404a designates a confirmation reply packet of a receiving failure (NACK) to be replied to the master station when the determination of the above-mentioned communication error determination block 402a is the abnormal receiving. The foregoing confirmation reply packet consists of five frames of a start data 55H, a non-acknowledged data 62H, a storage location address, and end data AAH and a checksum data.

Numeral 415a designates a write setting block that stores an indirect output signal or a set constant regularly transmitted after having replied the above-mentioned confirmation reply packet 430a (corresponding to the block 203 of FIG. 2). Numeral 405a designates a normal receiving processing block in which the above-mentioned second adding-subtracting means 230b subtracts the first variation value "1".

Numeral 406a designates a failure receiving processing block in which the second adding-subtracting means 230b adds the second or third variation value responsive to a determination result of the above-mentioned second communication error determination block 402a after having replied a confirmation reply packet 404a; and which generates the second error detection signal ER2 when a current value of the above-mentioned second adding-subtracting means 230b exceeds "11".

Numeral 407a designates a first communication error determination block (corresponding to the determination block 207 of FIG. 2) acting as bit error determination means or reply response error determination means that acts when the master station receives the above-mentioned confirmation reply packet 403a or 404a having been replied from the sub station. Numeral 408a designates a reply-incoming processing block in which the above-mentioned first adding-subtracting means 230a executes any addition and subtraction in accordance with a determination result of the foregoing determination block, or a retransmission processing is executed with the above-mentioned regular transmission packet 401a. In the foregoing reply-incoming processing block 408a, the regular transmission packet 401a is retransmitted in the case where a determination result of the above-mentioned first communication error determination block 407a is abnormal, or the above-mentioned confirmation reply packet 404a indicating the receiving failure is normally received; and the first error detection signal ER1 is generated when a current value of the above-mentioned first adding-subtracting means 230a exceeds "11".

FIG. 5 shows constitutions of an irregular transmission packet and a report reply packet in the case where the first control circuit section 200a (master station) makes a request for readout of any indirect input signal with respect to the second control circuit section 200b (sub station), or makes a request for readout of any saved data having been written and set already with a regular transmission packet 401a.

With reference to FIG. 5, numeral 401b designates an irregular transmission packet (corresponding to the irregular transmission packet 211 of FIG. 2) in the case where the master station makes the request for readout of various data with respect to the sub station (readout from the sub station to the master station). At the time of the readout request, first an irregular transmission packet 401b from the master station to the sub station is transmitted, and an address of data intended to read out is specified.

In addition, the above-mentioned irregular transmission packet 401b consists of five frames of a start data 55H, a command 30H, a readout location address, and end data AAH and a checksum data.

Numeral 402b designates a second communication error determination block (corresponding to the determination block 212 of FIG. 2) that acts when the sub station receives a series of data with the above-mentioned irregular transmission packet 401b, and executes the bit error determination in which presence or absence of any lack and mix of bits is detected by the parity check or the sum check.

Numeral 403b designates a report reply packet (corresponding to the report reply packet 215 of FIG. 2) to be replied to the master station when the determination of the above-mentioned second communication error determination block 402b is a normal receiving. The foregoing report reply packet consists of six frames of a start data 25H, a readout data 1, a readout data 2, a readout location address, an end data AAH and a checksum data.

In addition, the above-mentioned readout location address is a storage location address of the readout data 1. In the case where a readout data is 8 bits of data, the readout data 2 is a data of the address subsequent to that of the readout data 1 (for example, supposing that an address of the readout data 1 is 100 house number, an address of the readout data 2 is 101 house number).

Further, in the case where a readout data of the readout location address is 16 bits of data, the readout data 1 is a data of upper 8 bits, and the readout data 2 is a data of lower 8 bits.

Numeral 404b designates a confirmation reply packet to be replied to the master station when the determination of the above-mentioned second communication error determination block 402b is an abnormal receiving. The foregoing confirmation reply packet consists of five frames of a start data 55H, a non-acknowledged data 72H, a readout location address, and end data AAH and a checksum data.

Numeral 405b designates a normal receiving processing block in which the above-mentioned second adding-subtracting means 230b subtracts the first variation value "1" after having replied the above-mentioned report reply packet 403b.

Numeral 406b designates a failure receiving processing block in which the above-mentioned second adding-subtracting means 230b adds the second variation value responsive to a determination result of the above-mentioned second communication error determination block 402b after having replied the above-mentioned confirmation reply packet 404b; and which generates a second error detection signal ER2 when a current value of the second adding-subtracting means 230b exceeds "11".

Numeral 407b designates a first communication error determination block (corresponding to the determination block 217 of FIG. 2) acting as bit error determination means, reply response error determination means, or the like that acts when the master station receives the above-mentioned report reply packet 403b or confirmation reply packet 404b having been replied from the sub station. Numeral 408b designates a reply-incoming processing block in which the addition and subtraction by the above-mentioned first adding-subtracting means 230a is executed in accordance with a determination result of the foregoing determination block, or a retransmission processing is carried out with the above-mentioned irregular transmission packet 401b. The foregoing reply incoming processing block transmits an irregular transmission packet 401b again in the case where a determination result of the above-mentioned first communication error determination block 407b is abnormal, or the above-mentioned confirmation reply packet 404b indicating the receiving failure is normally received; and generates the first error detection signal ER1 when a current value of the above-mentioned first adding-subtracting means 230a exceeds "11".

Numeral 409b designates a readout information storage block (corresponding to the block 224 of FIG. 2) that acts when the determination of the above-mentioned first communication error determination means 407b is a normal receiving of the report reply packet 403b, and stores an read-out data having been reported and replied.

FIG. 6 shows a frame constitution of a regular report packet in the case of transmitting an indirect input signal from the second control circuit section 200b (sub station) with respect to the first control circuit section 200a (master station). At the time of regular report of an indirect input signal, first a regular transmission packet 401c is transmitted from the master station to the sub station, and then the transmission permission for a regular report will be given.

With reference to FIG. 6, numeral 401c designates a regular transmission packet acting as regular report permission means including permission information of the regular report (corresponding to the regular transmission packet 201 of FIG. 2). The foregoing regular transmission packet 401c consists of 6 frames of a start data 55H, a command 10H, a command data 01H, a specified address #00, an end data AAH and a checksum data. The above-mentioned command data is a data to permit a regular report and specify a report cycle.

Numeral 402c designates a second communication error determination block (corresponding to the determination block 202 of FIG. 2) that acts when the sub station receives a series of data provided with the above-mentioned regular transmission packet 401c, and carries out a bit error determination in which any lack and mix of bits is detected by the parity check or the sum check.

Numeral 403c designates a first regular report packet (corresponding to the regular report packet 221 of FIG. 2) to be relied to the master station when the determination of the above-mentioned second communication error determination block 402c is a normal receiving. The foregoing regular report packet 403c consists of 6 frames of a start data 11H, a report data 1, a report data 2, a status information, and end data AAH and a checksum data.

Numeral 404c designates a confirmation reply packet (corresponding to the block 205 of FIG. 2) to be replied to the master station when the determination of the above-mentioned second communication error determination block 402c is an abnormal receiving. The foregoing confirmation reply packet 404c consists of 5 frames of a start data 55H, a non-acknowledged data 62H, a specified address#00, an end data AAH and a checksum data.

Numeral 415c designates a write setting block that stores the above-mentioned command data having been received in a device memory of a specified address#00, not shown, after having replied the above-mentioned regular report packet 403c.

Numeral 405c designates a normal receiving processing block in which the above-mentioned second adding-subtracting means 230b subtracts the first variation value "1" after having transmitted the above-mentioned regular report packet 403c.

Numeral 406c designates a failure receiving processing block in which the above-mentioned second adding-subtracting means 230b adds the second variation value responsive to a determination result of the above-mentioned second communication error determination block 402c after having replied the above-mentioned confirmation reply packet 404c; and which generates the second error detection signal ER2 when a current value of the second adding-subtracting means 230b exceeds "11".

Numeral 407c designates a first communication error determination block (corresponding to the determination block 207 of FIG. 2) acting as bit error determination means, reply response error determination means, or the like that acts when the master station receives the above-mentioned regular report packet 403c or confirmation reply packet 404c having been replied from the sub station. Numeral 408c designates an incoming processing block that carries out the addition and subtraction by the above-mentioned first adding-subtracting means 230a in accordance with a determination result of the foregoing determination block 407c.

In addition, the above-mentioned incoming processing block 408c transmits a regular transmission packet 401c again in the case where a determination result of the above-mentioned first communication error determination block 407c is abnormal, or the above-mentioned confirmation reply packet 404c indicating the receiving failure is normally received; and generates the first error detection signal ER1 when a current value of the above-mentioned first adding-subtracting means exceeds "11".

Numeral 409c designates an input information storage block (corresponding to the block 224 of FIG. 2) that acts when the determination of the above-mentioned first communication error determination means 407c is a normal receiving of the regular report packet 403c, and stores the first reported data having been regularly reported.

Numeral 403d designates a regular report packet to be transmitted to the master station at the time when a specified report cycle T1 has passed since the transmission of the above-mentioned regular report packet 403c (corresponding to the regular report packet 221). The foregoing regular report packet has the same frame constitution as the above-mentioned regular report packet 403c.

Numeral 407d designates a first communication error determination block acting as bit error determination means, receiving interval error determination means, or the like that acts when the master station receives the above-mentioned regular report packet 403d having been transmitted from the sub station (corresponding to the determination block 223 of FIG. 2). Numeral 408d designates an incoming processing block in which the above-mentioned first adding-subtracting means 230a executes an addition and subtraction in accordance with a determination result of the foregoing determination block 407d.

In addition, the above-mentioned incoming processing block 408d makes a readout request with an irregular transmission packet 401b when a determination result of the above-mentioned first communication error determination block 407d is abnormal; and generates the first error detection signal ER1 when a current value of the above-mentioned first adding-subtracting means 230a exceeds "11".

Numeral 409d designates an input information storage block (corresponding to the block 224 of FIG. 2) that acts when the determination of the above-mentioned first communication error determination means 407d is a normal receiving of a regular report packet 403d, and stores a reported data having been regularly reported.

Status information 410c and 410d, which are contained in the above-mentioned regular report packets 403c and 403d is constituted as described later in detail referring to FIG. 15. A current value of the above-mentioned second adding-subtracting means 230b is stored in the lower 4 bits; a mnemonic address of an input having been regularly reported is stored in the subsequent upper 3 bits; and a readout request flag information is stored in the upper most 1 bit. When the above-mentioned readout request flag is at a logic level "1", the request for readout of a selected data memory of a specified address is carried out with an irregular transmission packet 401b.

In addition, for example, a device number or an error code number of any error occurrence that the second control circuit section 200b intends to report immediately is stored in the above-mentioned selected data memory. They are information unnecessary to be reported on a steady basis.

Further, a command data of the above-mentioned regular transmission packet 401c specifies an interval of a repetition cycle T1 of the regular report. When the foregoing command data is set, for example, to 00H, the regular report is stopped.

Figure 7:
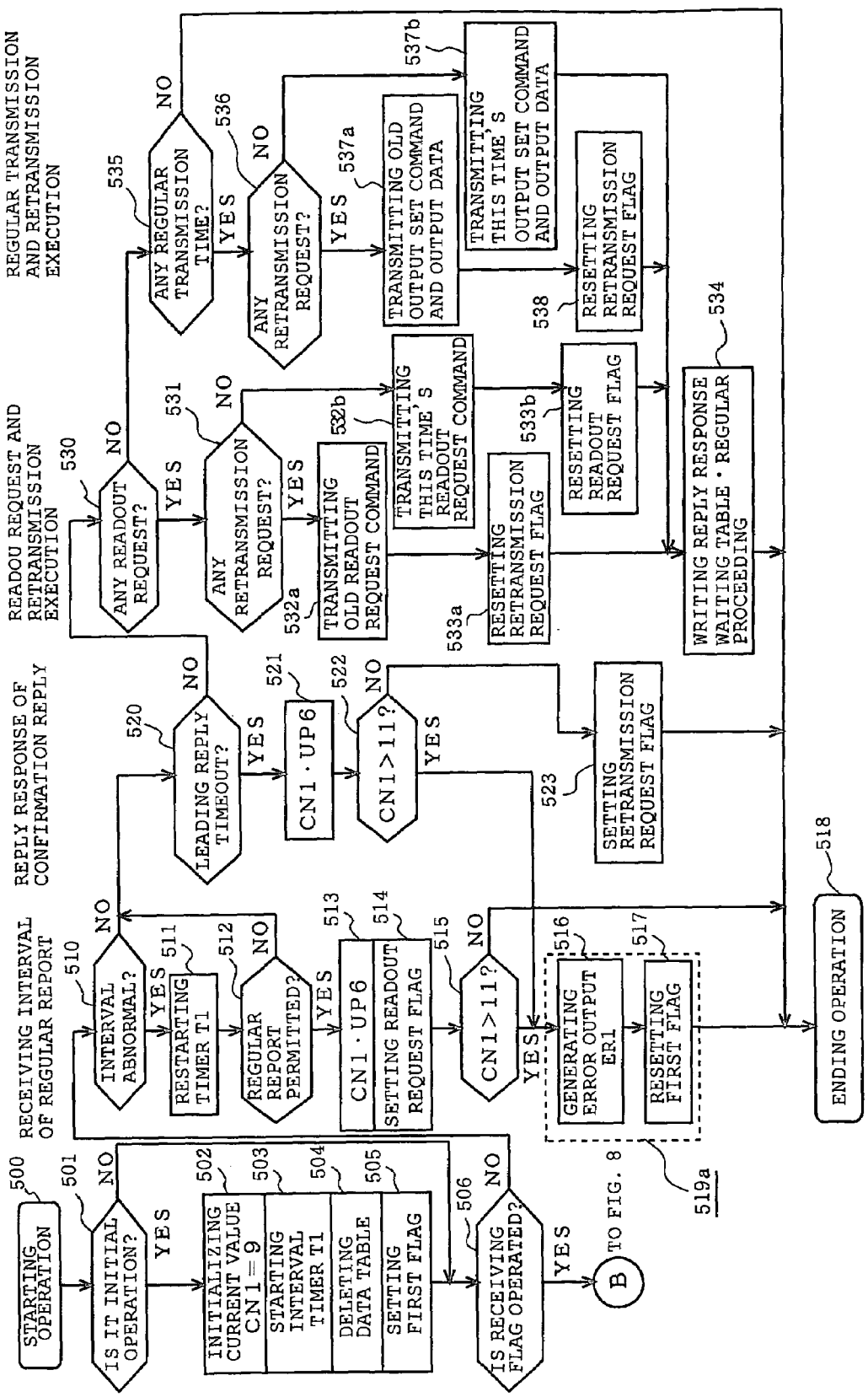
FIG. 7 is a flowchart for explaining a transmission operation in the first control circuit section of the electronic control unit according to the first embodiment.
Figure 8:
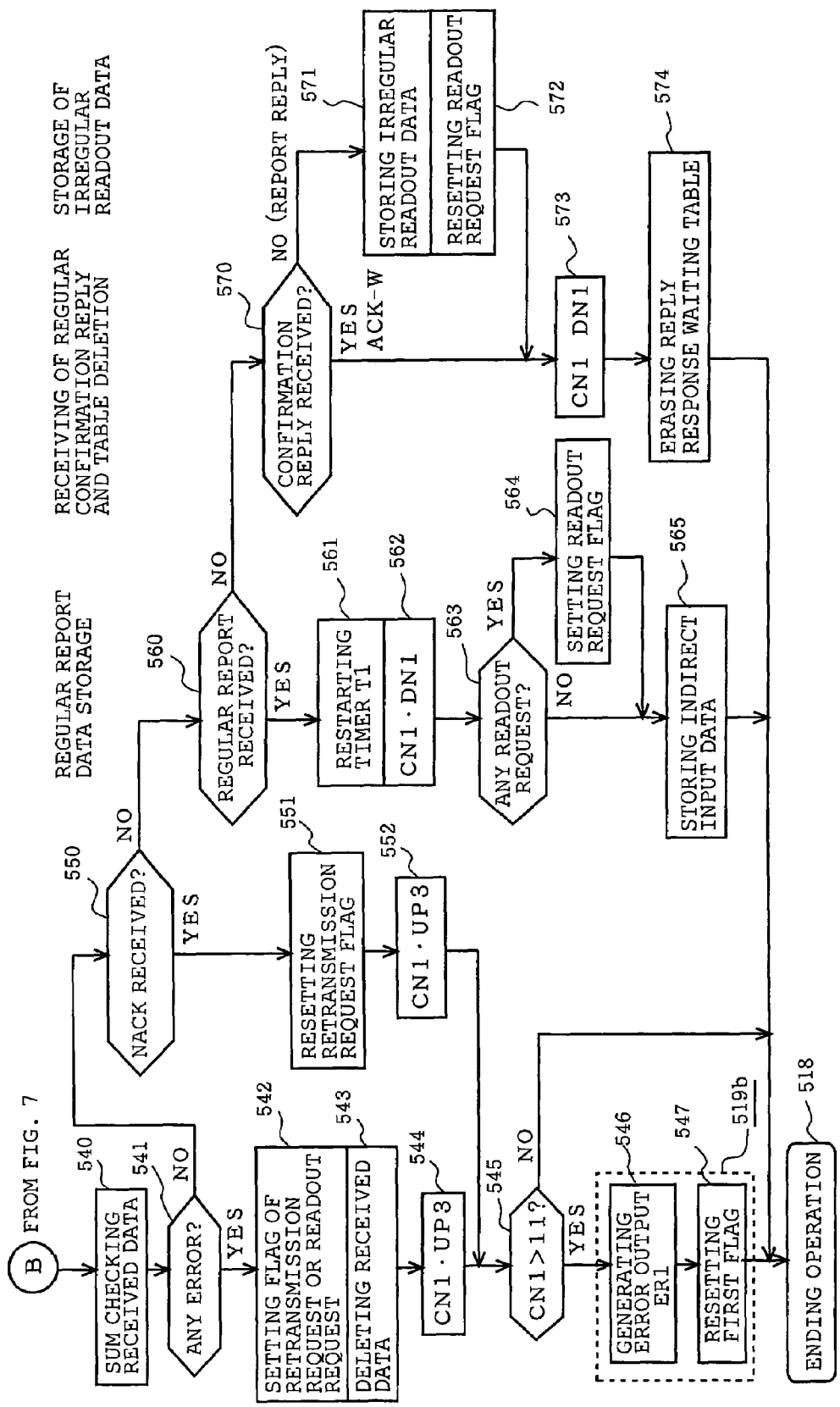
FIG. 8 is a flowchart for explaining a receiving operation in the first control circuit section of the electronic control unit according to the first embodiment.

Now, operations in the first control circuit section of the electronic control unit according to this first embodiment are described referring to FIGS. 7 and 8.

In this respect, FIG. 7 shows mainly a flow of transmission operation in the first control circuit section 200a. FIG. 8 shows mainly a flow of receiving operation in the first control circuit section 200a.

With reference to FIG. 7, numeral 500 is an operation start step of the microprocessor 110a that is regularly activated. The foregoing start step 500 is activated when the power supply switch 105a of FIG. 1 is turned on, and when a reset pulse signal RST1 is supplied to the main CPU 110a, and the foregoing start step 500 operates in a circulating manner subsequently to the later-described operation end step 518.

Numeral 501 is a step that acts subsequently to the above-mentioned Step 500, and determines whether or not it is a first operation depending on whether or not a first flag is set in the later-described Step 505. Numeral 502 is a step that acts when the determination of the foregoing Step 501 is YES (first operation), and sets a current value of the first adding-subtracting means 230a to the initial value "9".

Numeral 503 is a step that acts subsequently to the above-mentioned Step 502, and starts up an interval timer T1 the interval of which corresponds to a report repetition cycle T1 of FIG. 6. Numeral 504 is a step that acts subsequently to the foregoing Step 503, and deletes a content of the reply-waiting data table 206 of FIG. 2. Numeral 505 is a step that acts subsequently to the foregoing Step 504, and sets the first flag, not shown. The above-mentioned first flag is reset when the power supply switch 105b of FIG. 1 is turned on and when a reset pulse signal RST1 is supplied to the main CPU 110a.

Numeral 506 is a step that acts when the determination of the above-mentioned Step 501 is NO (it is not the first operation) or subsequently to the above-mentioned Step 505, and determines whether or not a receiving flag is operated indicating the fact that the first series-parallel converter 117 has received a serial data having been transmitted from the second series-parallel converter 127 to complete a parallel conversion. When the determination of the foregoing Step 506 is YES (receiving completion), the program proceeds to Step 540, shown in FIG. 8.

Numeral 510 is a step that acts when the determination of the above-mentioned Step 506 is NO (receiving flag is not operated yet), and determines whether or not the timer T1 having been started in the above-mentioned Step 503 and the later-described Step 511 or 561 (FIG. 8) has come to a state of Time's Up. Numeral 511 is a step that acts when the determination of the foregoing Step 510 determines YES (Time's Up), and restarts the timer T1. Numeral 512 is a step that acts subsequently to the foregoing Step 511, and discriminates whether or not the permission for regular report transmission has been given already with the regular transmission packet 401c of FIG. 6 and a command data 01H is written in a memory of an address#00. Numeral 513 is a step that acts when the determination of the foregoing Step 512 is YES (regular report permission is present), and adds 6 counts to operation means CN1 acting as first adding-subtracting means. Numeral 514 is a step that acts subsequently to the foregoing Step 513, and sets a readout request flag.

Numeral 515 is a step that acts subsequently to the above-mentioned Step 514, and determines whether or not a current value of the operation means CN1 acting as the first adding-subtracting means exceeds 11. Numeral 516 is a step that acts when the determination of the foregoing Step 515 is YES (exceeding 11), or when the determination of the later-described Step 522 is YES (exceeding 11), and generates a pulse output of the first error detection signal ER1. Numeral 517 is a step that acts subsequently to the foregoing Step 515, and resets the fist flag having been set in the above-mentioned Step 505. Numeral 518 is an operation end step that acts when the determination of the above-mentioned Step 515 is NO (not more than 11) or subsequently to the above-mentioned Step 517. Further, the above-mentioned operation start step 500 operates in a circulating manner subsequently to the foregoing Step 518.

In addition, numeral 519a is a step block that consists of the above-mentioned Steps 516 and 517, and acts as one of first initialization means.

Numeral 520 is a step that acts when the determination of the above-mentioned Step 510 is NO (timer T1 does not count up) or when the determination of the above-mentioned Step 512 is NO (regular report is not permitted), and determines whether or not a saving time period of a residual leading data of the reply-waiting data table (refer to numeral 206 of FIG. 2) having been written in the later-described Step 534 exceeds a predetermined reply response time period T. Numeral 521 is a step that acts when the determination of the foregoing Step 520 is YES (timeout), and adds 6 counts to the operation means CN1 acting as the first adding-subtracting means. Numeral 522 is a step that acts subsequently to the foregoing Step 521, and determines whether or not a current value of the operation means CN1 acting as the first adding-subtracting means exceeds 11. Numeral 523 is a step that acts when the determination of the foregoing step 522 is NO (not more than 11), and sets a retransmission request flag. The program proceeds to the above-mentioned operation end step 518 subsequently to the foregoing Step 523.

Furthermore, the above-mentioned reply-waiting data table 206 is constituted of plural stages of shift register in which a stored data shifts every predetermined time period. In response to the fact that a reply-waiting command having been stored in the foregoing shift register shifts to an overflow register, a timeout determination by the above-mentioned Step 520 is carried out.

Numeral 530 is a step that acts when the determination of the above-mentioned Step 520 is NO (it is not timeout), and determines whether or not a readout request flag is set in the above-mentioned Step 514 or the later-described Steps 542 and 564 (FIG. 8). Numeral 531 is a step that acts when the determination of the foregoing Step 530 is YES (readout request is present), and determines whether or not a retransmission request flag is set in the above-mentioned Step 523 or the later-described Steps 542 and 551 (FIG. 8). Numeral 532a is a step that acts when the determination of the foregoing Step 531 is YES (retransmission request is present), and transmits the old readout request having been transmitted already with an irregular transmission packet 401b. Numeral 533a is a step that acts subsequently to the foregoing step 532a, and resets the retransmission request flag.

Numeral 532b is a step that acts-when the determination of the above-mentioned Step 531 is NO (retransmission request is absent), and transmits with an irregular transmission packet 401b this time's readout request having been requested for the readout in the above-mentioned Step 530. Numeral 533b is a step that acts subsequently to the foregoing Step 532b, and resets a readout request flag. Numeral 534 is a step that acts subsequently to the above-mentioned Steps 533a and 533b or the later-described Steps 538 and 537b, and sequentially stores in the reply-waiting data table 206 command having been transmitted in the above-mentioned Steps 532a and 532b and the later-described Steps 537a and 537b; and carries out a shift operation of a data table acting as a shift register, and then proceeds to the above-mentioned operation end step 518.

Numeral 535 is a step that acts when the determination of the above-mentioned Step 530 is NO (readout request is absent), and discriminates whether or not it is the time when a regular transmission is carried out with a regular transmission packet 401a. Numeral 536 is a step that acts when the discrimination of the foregoing Step 535 is YES (regular transmission time), and determines whether or not a retransmission request flag is set in the above-mentioned Step 523 or the later-described Steps 542 and 551 (FIG. 8). Numeral 537a is a step that acts when the determination of the foregoing Step 536 is YES (retransmission request is present), and transmits a regular transmission packet 401a based on the transmission command having been transmitted already. Numeral 538 is a step that acts subsequently to the foregoing Step 537a, and resets a retransmission request flag.

Numeral 537b is a step that acts when the determination of the above-mentioned Step 536 is NO (retransmission request is absent), and transmits this time's regular transmission packet 401a. When the determination of the above-mentioned Step 535 is NO (it is not a regular transmission time), the program proceeds to the above-mentioned operation end step 518.

With reference to FIG. 8, numeral 540 is a step that acts when the determination of the above-mentioned Step 506 (FIG. 7) is YES (receiving flag operates), and carries out a sum check of the received data.

In addition, a frame of a checksum, which is obtained by performing a binary addition of all frame data from a start data STX to an end data ETX, is added to each transmit-receive packet. Further, it is the sum check that performs the binary addition of all the frame data from a start data STX to a checksum data, and determines whether or not a result of this binary addition is a normal value 00H.

Numeral 541 is a step that acts subsequently to the above-mentioned Step 540, and determines whether or not there is any error as a result of the sum check. Numeral 542 is a step that acts when the determination of the foregoing Step 541 is YES (error is present), and sets a retransmission request flag or a readout request flag. Numeral 543 is a step that acts subsequently to the foregoing Step 542, and deletes the received data in which error is present. Numeral 544 is a step that acts subsequently to the foregoing Step 543, and adds 3 counts to the operation means CN1 acting as the first adding-subtracting means.

Additionally, when data having received in the above-mentioned Step 542 cannot be identified whether it is of a confirmation reply packet with respect to the regular transmission, a report reply packet with respect to an irregular transmission packet, or a regular report packet, no retransmission request flag or readout request flag is set.

Numeral 545 is a step that acts subsequently to the above-mentioned Step 544 or the later-described Step 552, and determines whether or not a current value of the operation means CN1 acting as the first adding-subtracting means exceeds 11. Numeral 546 is a step that acts when the determination of the foregoing Step 545 is YES (exceeding 11), and generates a pulse output of the first error detection signal ER1. Numeral 547 is a step that acts subsequently to the foregoing Step 546, and resets the first flag having been set in the above-mentioned Step 505 (FIG. 7). When the determination of the above-mentioned Step 545 is NO (not more than 11) or subsequently to the above-mentioned Step 547, the program proceeds to the above-mentioned operation end step 518, and then the above-mentioned operation start step 500 operates in a circulating manner.

In addition, numeral 519b is a step block that consists of the above-mentioned Steps 546 and 547, and acts as one of the first initialization means.

Numeral 550 is a step that acts when the determination of the above-mentioned Step 541 is NO (sum check error is absent), and determines whether or not the data having been received normally from the sub station is the one relating to the receiving failure (NACK) at the sub station. Numeral 551 is a step that acts when the determination of the foregoing Step 550 is YES (receiving failure), and sets a retransmission request flag. Numeral 552 is a step that acts subsequently to the foregoing Step 551, and adds 3 counts to the operation means CN1 acting as the first adding-subtracting means. Subsequently to the foregoing Step 552, the program proceeds to the above-mentioned Step 545.

Numeral 560 is a step that acts when the determination of the above-mentioned Step 550 is NO (it is not a receiving failure), and discriminates whether or not a received data is a regular report from the sub station with a regular report packet. Numeral 561 is a step that acts when the discrimination of the foregoing Step 560 is YES (regular report receiving), and restarts a report interval timer T1. Numeral 562 is a step that acts subsequently to the foregoing Step 561, and subtracts 1 count from a value of the operation means CN1 acting as the first adding-subtracting means. Numeral 563 is a step that acts subsequently to the foregoing step 562, and determines whether or not a readout request flag is set in the data having been reported regularly. Numeral 564 is a step that acts when the determination of the foregoing Step 563 is YES (readout request is present), and sets a readout request flag. Numeral 565 is a step that acts when the determination of the above-mentioned Step 563 is NO (readout request is absent) or subsequently to the above-mentioned Step 564, and stores and saves a regular report data having been received. The program proceeds to the above-mentioned operation end step 518 subsequently to the foregoing Step 565.

Figure 9:
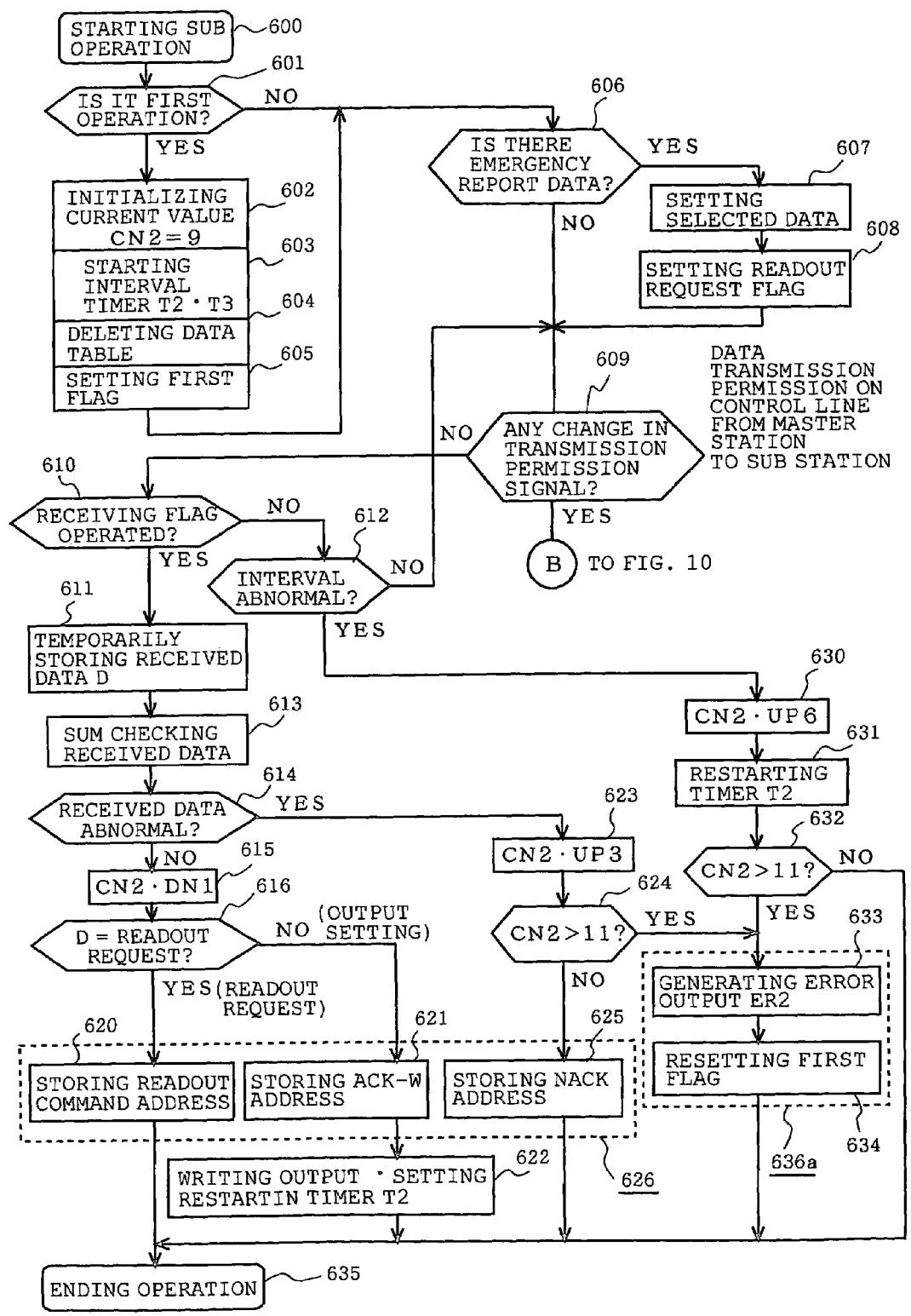
FIG. 9 is a flowchart for explaining a receiving operation in the second control circuit section of the electronic control unit according to the first embodiment.

In addition, the readout request flag in the above-mentioned Step 563 is the one that is set on the sub station side in Step 608 of FIG. 9.

Numeral 570 is a step that acts when the discrimination of the above-mentioned Step 560 is NO (it is not a receiving of regular report), and discriminates whether or not it is a receiving of a confirmation reply. Numeral 571 is a step that acts when the discrimination of the foregoing Step 570 is NO (it is not a confirmation reply with respect to the regular transmission, but a report reply with respect to the irregular transmission), and stores an irregular readout data having been replied and reported from the sub station. Numeral 572 is a step that acts subsequently to the foregoing Step 571, and resets a readout request flag having been set in the above-mentioned Step 514 (FIG. 7) or the above-mentioned Steps 542 and 564. Numeral 573 is a step that acts when the discrimination of the above-mentioned Step 570 is YES (confirmation reply of the normal receiving with respect to the regular transmission), or subsequently to the above-mentioned Step 572, and subtracts 1 count from a value of the operation means CN1 acting as the first adding-subtracting means. Numeral 574 is a step that acts subsequently to the foregoing Step 573, and erases a command that has been replied from in the reply-waiting data table 206 having been stored in Step 534 of FIG. 7. Subsequently to the foregoing Step 574, the program proceeds to the above-mentioned operation end step 518.

The heretofore operations are described in brief. With reference to FIGS. 7 and 8, numerals 519a and 519b are first initialization means that resets the first flag thereby carrying out Steps 502-504 in the next operation to initialize the first control circuit section 200a, and generates the first error detection signal ER1 to initialize and restart the second control circuit section 200b. Numeral 510 is first communication error determination means acting as receiving interval monitoring means of the regular report. Numeral 513 is first adding-subtracting means for adding the third variation value "6". Numeral 516 is first error occurrence definition means for generating the first error detection signal ER1. Numeral 520 is first communication error determination means acting as reply delay monitoring means. Numeral 521 is first adding-subtracting means for adding the third variation value "6". Numeral 532a is retransmission means of an irregular transmission packet with respect to the retransmission request. Numeral 532b is irregular transmission means responsive to the readout request. Numeral 537a is retransmission means with respect to the regular transmission. Numeral 537b is regular transmission means.

Further, with reference to FIG. 8, numeral 540 is first communication error determination means acting as bit information monitoring means. Numeral 544 is first adding-subtracting means for adding the second variation value "3". Numeral 546 is first error occurrence definition means for generating the first error detection signal ER1. Numeral 552 is first adding-subtracting means for adding the second variation value "3". Numeral 562 and 573 is first adding-subtracting means for subtracting the first variation value "1".

In addition, the determination block 207 of FIG. 2 includes the first communication error determination means 540 acting as bit information monitoring means and the first communication error determination means 520 acting as reply delay monitoring means. Likewise, the determination block 217 includes the first communication error determination means 540 acting as bit information monitoring means and the first communication error determination means acting as reply delay monitoring means. Further, the determination block 223 includes the first communication error determination means 540 acting as bit information monitoring means and the first communication error determination means 510 acting as receiving interval monitoring means of the regular report.

Figure 10:
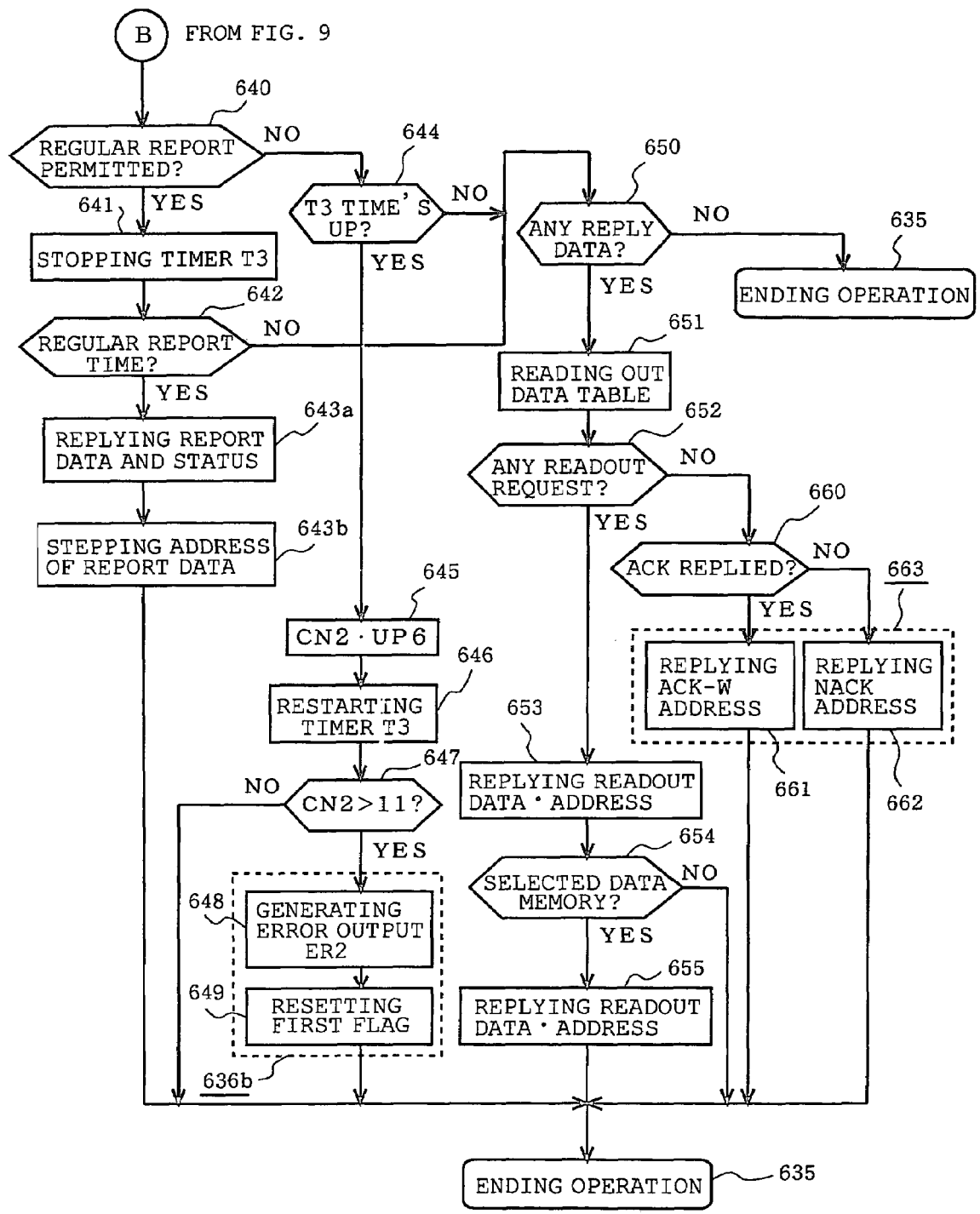
FIG. 10 is a flowchart for explaining a transmission operation in the second control circuit section of the electronic control unit according to the first embodiment.

Now, with reference to FIGS. 9 and 10, operations of communication control in the second control circuit section of the electronic control unit according to this first embodiment are described.

In this respect, FIG. 9 shows mainly an equivalent control flow relating to a receiving operation of the associative control circuit section 120a in the second control circuit section 200b. FIG. 10 shows mainly an equivalent control flow relating to a transmission operation of the associative control circuit section 120a in the second control circuit section 200b.

With reference to FIG. 9, numeral 600 is an operation start step of the associative control circuit section 120a that is regularly activated. The foregoing start step 600 is activated when the power supply switch 105b of FIG. 1 is turned on and when a reset pulse signal RST2 is supplied; and operates in a circulating manner subsequently to the later-described operation end step 635.

Numeral 601 is a step that acts subsequently to the above-mentioned Step 600, and determines whether or not it is a first operation depending on whether or not a first flag is set in the later-described Step 605. Numeral 602 is a step that acts when the determination of the foregoing Step 601 is YES (first operation), and sets a current value of a second adding-subtracting means 230b to an initial value "9". Numeral 603 is a step that acts subsequently to the foregoing Step 602, and starts an interval timer T2 corresponding to a regular transmission cycle and the delay monitoring timer T3 described later. Numeral 604 is a step that acts subsequently to the foregoing Step 603, and deletes a content of the unprocessed data table 204 of FIG. 2. Numeral 605 is a step that acts subsequently to the foregoing Step 604, and sets the first flag, not shown. The above-mentioned first flag is reset when the power supply switch 105b, not shown, is turned on and when a reset pulse signal RST2 is supplied to the associative control circuit section 120a.

Numeral 606 is a step that acts when the determination of the above-mentioned Step 601 is NO (it is not the first operation), or subsequently to the above-mentioned Step 605, and determines whether or not any error is detected by, e.g., self-diagnosis of an input/output in the associative control circuit section 120a and there is any request for this error to be immediately reported to the master station. Numeral 607 is a step that acts when the determination of the foregoing Step 606 is YES (emergency report data is present) and writes a data content such as error occurrence input/output number or error code number intended to be reported to a selection data memory of a specified address. Numeral 608 is a step that acts subsequently to the foregoing Step 607 and sets a readout request flag. Numeral 609 is a step that acts when the determination of the above-mentioned Step 606 is NO (emergency report data is absent) or subsequently to the above-mentioned Step 608, and determines whether or not a logic level of a control signal line, not shown, is inverted, and a transmission permission to the master station is given.

In addition, when the determination of the above-mentioned Step 609 is YES (change in transmission permission signal is present), the program proceeds to Step 640 of FIG. 10.

Numeral 610 is a step that acts when the determination of the above-mentioned Step 609 is NO (transmission permission is absent), and determines whether or not a receiving flag operates indicating that the second series-parallel converter 127 receives a serial data having been transmitted from the first series-parallel converter 117, completes a parallel conversion. When the determination of the foregoing Step 510 is NO (not receiving yet), the program proceeds to the later-described Step 612.

Numeral 611 is a step tat acts when the determination of the above-mentioned Step 610 is YES (receiving flag operates), and temporarily stores a series of received data having been received form the master station in a register D. Numeral 612 is a step that determines whether or not the receiving interval monitoring timer T2 having been started in the above-mentioned Step 603 is Time's Up. When the determination of the foregoing Step 612 is NO and there is no receiving interval error, the program proceeds to the above-mentioned Step 609. When the determination of Step 612 is YES and there is any receiving interval error, the program proceeds to the later-described Step 630.

Numeral 613 is a step that acts subsequently to the above-mentioned Step 611, and carries out a sum check of a series of received data having been received by the above-mentioned Step 611. Numeral 614 is a step that acts subsequently to the foregoing Step 613, and determines whether or not there is any error in the received data. Numeral 615 is a step that acts when the determination of the foregoing Step 614 is NO (normal), and subtracts 1 count from a value of operation means CN2 acting as second adding-subtracting means. Numeral 616 is a step that acts subsequently to the foregoing Step 615, and discriminates whether a received data by the above-mentioned Step 611 is an output setting with a regular transmission packet 401a or a readout request with an irregular transmission packet 401b.

Numeral 620 is a step that acts when the discrimination of the above-mentioned Step 616 is a readout request, and temporarily stores a readout request command 30H and an address. Numeral 621 is a step that acts when the determination of the above-mentioned Step 616 is the output setting, and temporarily stores an ACK•61H and the address. Numeral 622 is a step that acts subsequently to the foregoing Step 621, and stores an output set data having been obtained in the above-mentioned Step 611 in a device memory of a specified address or a second a second set data memory 237b, and restarts the receiving interval monitoring timer T2.

Numeral 623 is a step that acts when the determination of the above-mentioned Step 614 is YES (received data is abnormal), and adds 3 counts to a value of the operation means CN2 acting as the second adding-subtracting means. Numeral 624 is a step that acts subsequently to the foregoing Step 623, and determines whether or not a current value of the operation means CN2 acting as the second adding-subtracting means exceeds 11. Numeral 625 is a step that acts when the determination of the foregoing Step 624 is NO (not more than 11), and temporarily stores an NACK•82H and the address. The program proceeds to the above-mentioned operation end step 635 subsequently to the above-mentioned Steps 620, 622, 625.

Numeral 626 is a step block that consists of the above-mentioned Steps 620, 621, 625. This step block is a reply command data that is stored in the unprocessed data table 204 of FIG. 2.

In addition, an NACK reply code corresponding to the readout request or the output setting is not separated in the above-mentioned Step 625. As shown in FIGS. 4 and 5, however, it is also possible to separate this NACK reply code at 62H or 72H by noting a start data STX.

Numeral 630 is a step that acts when the determination of the above-mentioned Step 612 is YES (receiving interval of regular transmission data is too large), and adds 6 counts to a value of the operation means CN2 acting as the second adding-subtracting means. Numeral 631 is a step that acts subsequently to the foregoing Step 630, and restarts the receiving interval timer T2. Numeral 632 is a step that acts subsequently to the foregoing Step 631, and determines whether or not a current value of the operation means CN2 acting as the second adding-subtracting means exceeds 11. Numeral 633 is a step that acts when the determination of the foregoing Step 632 is YES (exceeding 11) or when the determination of the above-mentioned Step 624 is YES (exceeding 11), and generates a pulse output of the second error detection signal ER2. Numeral 634 is a step that acts subsequently to the foregoing Step 633, and resets the first flag having been set in the above-mentioned Step 605. The program proceeds to the above-mentioned operation end step 635 when the determination of the above-mentioned Step 632 is NO (not more than 11) or subsequently to the above-mentioned Step 634.

In addition, numeral 636a is a step block that consists of the above-mentioned Steps 633 and 634, and acts as one of second initialization means.

With reference to FIG. 10, numeral 640 is a step that acts when the determination of the above-mentioned Step 609 (FIG. 9) is YES (transmission permission is present), and determines whether or not a regular transmission packet 401c of FIG. 6 is received and a regular report is permitted. Numeral 641 is a step that acts when the determination of the foregoing Step 640 is YES (regular report is permitted), and stops the timer T3 having been started in the above-mentioned Step 603. Numeral 642 is a step that acts subsequently to the foregoing Step 641, and determines whether or not it is a time of the regular report. Numeral 643a is a step that acts when the determination of the foregoing Step 642 is YES (it is the regular report time), and transmits a regular report packet 403c or 403d of FIG. 6. Numeral 643b is a step that acts subsequently to the fore going Step 642, and sends an address of the data to be regularly reported next. Subsequently to the foregoing Step 643b, the program proceeds to the above-mentioned operation end step 635.

Numeral 644 is a step that acts when the determination of the above-mentioned Step 640 is NO (regular report is not permitted yet), and determines whether or not the timer T3 having been started in the above-mentioned Step 603 is Time's Up. Numeral 645 is a step that acts when the determination of the foregoing Step 644 is YES and the regular report permission cannot be obtained despite waiting for a time period T3 after the start of operation, and adds 6 counts to a value of the operation means CN2 acting as the second adding-subtracting means. Numeral 646 is a step that acts subsequently to the foregoing Step 645, and restarts the timer T3. Numeral 647 is a step that acts subsequently to the foregoing Step 646, and determines whether or not a current value of the operation means CN2 acting as the second adding-subtracting means exceeds 11. Numeral 648 is a step that acts when the determination of the foregoing Step 647 is YES (exceeding 11), and generates a pulse output of the second error detection signal ER2. Numeral 649 is a step that acts subsequently to the foregoing Step 648, and resets the first flag having been set in the above-mentioned Step 605. The program proceeds to the above-mentioned operation end step 635 when the determination of the above-mentioned Step 647 is NO (not more than 11) or subsequently to the above-mentioned Step 649.

In addition, numeral 636b is a step block consisting of the above-mentioned Steps 648 and 649, and acts as one of second initialization means.

Numeral 650 is a step that acts when the determination of the above-mentioned Step 644 is NO (it is not Time's Up) or the determination of the above-mentioned Step 642 is NO (it is not the regular report time), and determines whether or not there is any reply command having been stored in the unprocessed data table 204 in the above-mentioned step block 626. Numeral 651 is a step that acts when the determination of the foregoing Step 650 is YES (reply command is present), and reads out a reply command having been stored in the above-mentioned unprocessed data table 204 in a mode of first-in first-out. Numeral 652 is a step that acts subsequently to the foregoing Step 651, and discriminates whether or not a reply command having been read out in Step 651 is a readout request command having been stored in the above-mentioned Step 620. Numeral 653 is a step that acts when the discrimination of the foregoing Step 652 is YES (it is the readout request), and reports and replies a readout data relating to a memory of a specified address along with the corresponding address.

Numeral 654 is a step that acts subsequently to the above-mentioned step 653, and discriminates whether or not address of the data having been reported and replied in Step 653 is the address of a selected data memory in which the data has been written in the above-mentioned Step 607. Numeral 655 is a step that acts when the discrimination of the foregoing Step 654 is YES (it is the selected data memory), and resets the readout request flag having been set in the above-mentioned Step 608. The program proceeds to the above-mentioned operation end step 635 when the discrimination of the above-mentioned Step 654 is NO (it is not the selected data memory) or subsequently to the above-mentioned Step 655.

Numeral 660 is a step that acts when the discrimination of the above-mentioned Step 652 is NO (it is not the readout request), and discriminates whether a reply data having been read out in the above-mentioned Step 651 is an ACK-W (normal receiving with respect to the regular transmission) having been stored in the above-mentioned Step 621 or a NACK having been stored in the above-mentioned Step 625. Numeral 661 is a step that acts when the discrimination of the foregoing Step 660 is YES (ACK-W), and replies an acknowledged data ACK and the corresponding address. Numeral 662 is a step that acts when the determination of the above-mentioned Step 660 is NO (NACK), and replies a non-acknowledged data NACK and the corresponding address. The program proceeds to the above-mentioned operation end step 635 when the determination of the above-mentioned Step 650 is NO (reply data is absent) or subsequently to the above-mentioned Steps 661 and 662.

In addition, numeral 663 is a step block consisting of the above-mentioned Steps 661 and 662. The foregoing step block corresponds to the transmission of the confirmation reply packets 403a, 404a, 404b of FIGS. 4a and 4b, and the above-mentioned Step 653 corresponds to the report reply packet 403b of FIG. 5.

The heretofore operations are described in brief. With reference to FIGS. 9 and 10, numerals 636a and 636b are second initialization means that resets the first flag thereby carrying out Steps 602-604 in the next operation to initialize the second control circuit section 200b, and generates the second error detection signal ER2 to initialize and restart the first control circuit section 200a. Numeral 608 is readout request setting means with which the sub station requests for the master station to read out a content of any selected data memory of a specified address. Numeral 612 is second communication error determination means acting as receiving integral monitoring means of a regular transmission packet. Numeral 613 is second communication error determination means acting as bit information monitoring means relating to the data having been transmitted from the master station. Numeral 615 is second adding-subtracting means for subtracting the first variation value "1". Numeral 623 is second adding-subtracting means for adding the second variation value "3". Numeral 630 is second adding-subtracting means for adding the third variation value "6". Numeral 633 is second error occurrence definition means for generating the second error detection signal ER2.

Further, with reference to FIG. 10, numeral 643a is regular report means for transmitting a regular report packet. Numeral 644 is permitted time period determination means. Numeral 645 is second adding-subtracting means for adding the third variation value "6". Numeral 648 is second error occurrence definition means for generating the second error detection signal ER2. Numeral 653 is report reply means for transmitting a report reply packet with respect to the readout request. Numeral 663 is confirmation reply means for transmitting a confirmation reply packet of the normal receiving or the receiving failure.

In addition, the determination block 202 of FIG. 2 includes the second communication error determination means 612 acting as receiving interval monitoring means of a regular transmission packet and the second communication error determination means 613 acting as bit information monitoring means relating to data having been transmitted from the master station. Thus the determination block of FIG. 2 is second communication error determination means 613 itself acting as bit information monitoring means relating to data having been transmitted from the master station.

The action and operation are described in brief referring to FIGS. 1 and 2 in consideration the foregoing descriptions of the flowcharts in FIGS. 7 to 10.

With reference to FIG. 1, the main CPU 110a uses the first and second input sensor groups 102a an 102b and the first and second analog sensor groups 103a and 103b as input signal, and controls the first and second electrical load groups 104a and 104b based on a control program or a control constant that is stored in the non-volatile program memory 115a. However, the above-mentioned second input sensor group 102b, the second analog sensor group 103b and the second electrical load group 104b perform a serial communication indirectly with the main CPU 110a via the first and second series-parallel converters 117 and 127.

Additionally, although an analog output is not utilized in the foregoing first embodiment shown in FIG. 1, it is also possible to mount a DA converter for a meter display as an indirect output, if necessary.

When the first error detection signal ER1 is generated in the first control circuit section 200a, the first flag is rest in Step 517 of FIG. 7 or in Step 547 of FIG. 8, and then the program proceeds to the operation end step 518. Therefore, when the program goes to the operation start step 500 again, initialization of the first control circuit section 200a itself is carried out in Steps 502-505.

On the other hand, a reset pulse signal is inputted to a reset input terminal RST2 of the second control circuit section 200b with the first error detection signal ER1 whereby the second control circuit section 200b, being the other side, is initialized and restarted as well.

Likewise, when the second error detection signal ER1 is generated in the second control circuit section 200b, the first flag is rest in Step 634 of FIG. 9 or in Step 649 of FIG. 10, and then the program proceeds to the operation end step 635. Therefore, when the program goes to the operation start step 600 again, initialization of the second control circuit section 200b itself is carried out in Steps 602-605.

On the other hand, a reset pulse signal is input to a reset input terminal RST1 of the main CPU 110a in the first control circuit section 200a with the second error detection signal ER2 whereby the first control circuit section 200a, being the other side, is also initialized and restarted as well.

The first and second control circuit sections 200a and 200b are initialized and restarted also with a reset pulse signal RST1 from the watchdog timer (watchdog timer: a circuit that monitors an operation step of a computer, and detects any error operation of the system) 130. However, upon generation of the first and second error detection signals ER1 and ER2 or a reset pulse signal RST1 provided by the watchdog timer 130, the error storage circuit 131a stores this generation of signals to bring the alarm and display 108 in operation, and stops the operation of the load power supply relay 107a so that a power feed with respect to a part of specified electrical loads is stopped.

Accordingly, in the case where the main CPU 110a temporarily malfunctions due to a noise malfunction, the main CPU is automatically restarted with reset pulse RST1. However, a drive stop state of a part of the electrical loads due to the operation stop of the load power supply relay 107a still continues.

Nevertheless, when the power supply switch 15b is turned on again, the error storage of the error storage circuit 131a is cleared thereby enabling to recover the normal operation state.

With reference to FIG. 2, basic transmit-receive data in this first embodiment are constituted of an output setting with a regular transmission packet from the master station to the sub station, and an input readout with a regular report packet from the sub station to the master station.

However, to prevent any erroneous output setting, a receiving confirmation reply from the sub station to the master station is carried out with respect to the transmission from the master station to the sub station.

Further, the master station can irregularly read out data on the sub station side by the readout request; and information of a specified address can be read out through the readout request by setting a readout request flag in a regular report also on the sub station side.

In addition, supposing that there is only a reciprocating communication in which a master station transmits and the sub station replies to this transmission, the master station waits for the reply from the sub station and, then, carries out the next transmission thereby enabling to prevent the jam-up of communication.

However, supposing that the sub station side intends to transmit the regular report to the master station without any command of the master station, the jam-up will occur in an upstream communication.

The unprocessed data table 204 is to make a queue of un-replied information and carries out the sequential replying when such jam-up occurs, thereby enabling to execute the regular transmission or the regular report on a timely basis.

Furthermore, it is arranged such that the regular report from the sub station is inhibited at the time of the operation start when there are a large amount of data of downstream communication, and that the main CPU 110a transmits an initial set data in a concentrated manner and executes the readout request with an irregular transmission packet on a timely basis thereby enabling to carry out the readout of an indirect input information.

Embodiment 2

Figure 11:
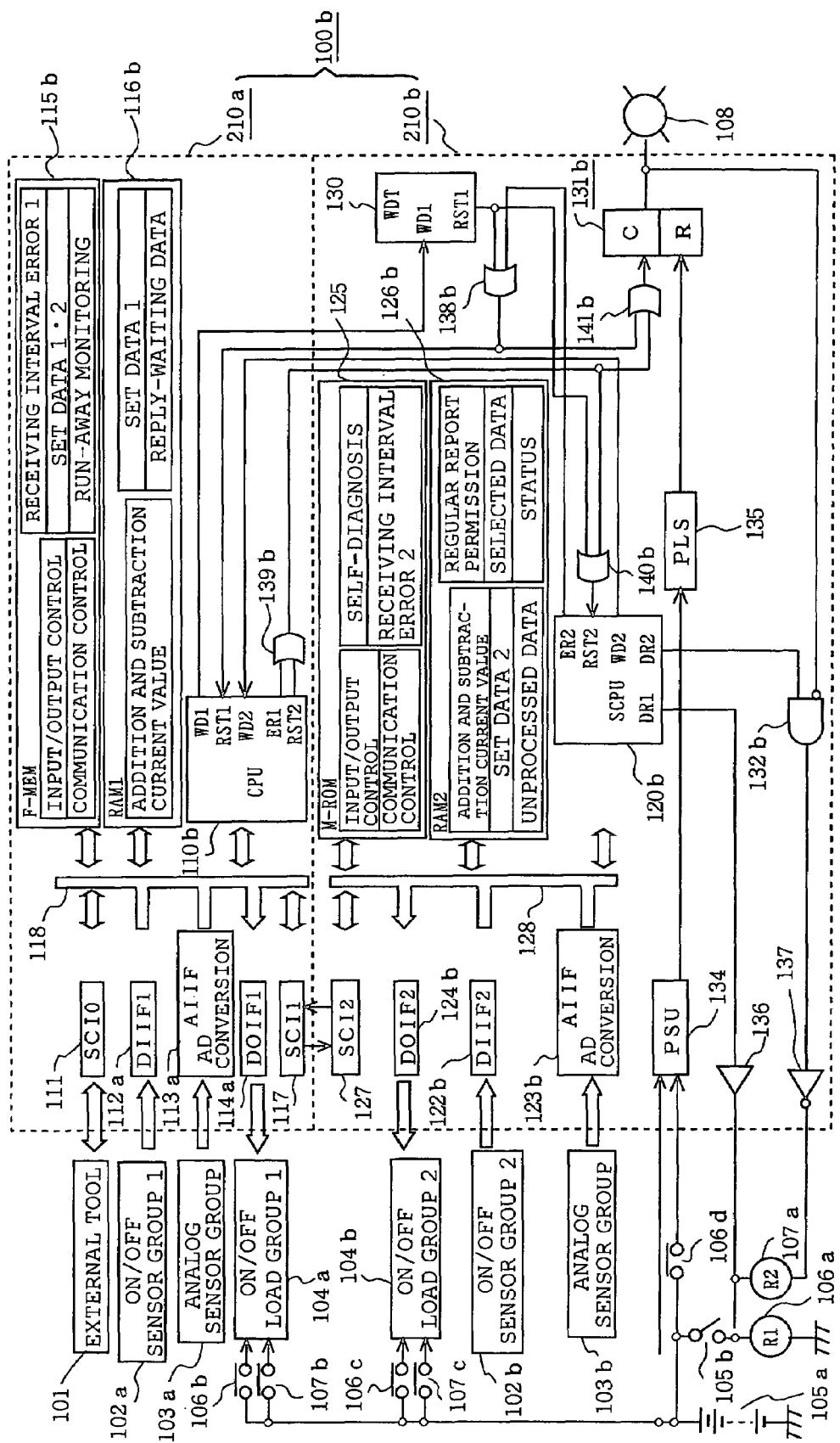
FIG. 11 is a block diagram showing an entire constitution of an electronic control unit according to a second preferred embodiment.

FIG. 11 is a block diagram showing an entire constitution of an electronic control unit according to a second preferred embodiment.

Hereinafter, constitution and operation of the electronic control unit according to the second embodiment are described, focusing on points different from the electronic control unit according to the foregoing first embodiment shown in FIG. 1.

With reference to FIG. 11, numeral 100b designates an electronic control unit that consists of a first control circuit section 210a and a second control circuit section 210b. Numeral 110b designates a main CPU (microprocessor). Numeral 115b designates a non-volatile program memory such as flash memory cooperating with the foregoing main CPU 110b. Written in the above-mentioned program memory 115b are a program acting as input/output control means, or a program acting as communication control means, as well as a set data to be transferred and written in the first and second set data memory 237a and 237b (refer to FIG. 2), a program acting as run-away monitoring means with respect to the later-described auxiliary CPU (microprocessor) 120b, or a program acting as first receiving interval error determination means.

Numeral 116b designates a RAM memory for an operation processing. Written in the foregoing RAM memory 116b are a current value data of the first adding-subtracting means 230a (refer to FIG. 2), a first set data having been transferred from the above-mentioned program memory 115b, or a reply-waiting command data.

Numeral 120b designates an auxiliary CPU (microprocessor) Numeral 125 designates an auxiliary program memory cooperating with the foregoing auxiliary CPU 120b. Stored in the foregoing auxiliary program memory 125 are a program acting as input/output control means in the second control circuit section 210b or a self-diagnosis program, or a communication control program or a program acting as second receiving interval error determination means.

Numeral 126b designates an auxiliary RAM memory. Written in the foregoing auxiliary RAM memory 126b are a current value data of the second adding-subtracting means 230b (refer to FIG. 2), a second set data having been transferred from the above-mentioned program memory 115b, or an unprocessed command data, as well as a regular report permission command data, a selected data, status information and the like.

In addition, the above-mentioned main CPU 110b monitors a pulse width of a watchdog clear signal WD2 that the auxiliary CPU 120b generates, and generates a reset pulse signal RST2 when the foregoing pulse width exceeds a predetermined value.

Numeral 131b designates a count storage circuit including a count input, a reset input and a count up output (error occurrence storage means). Numeral 138b designates an OR element with respect to a reset pulse signal RST1 that the above-mentioned watchdog timer 130 generates and the second error detection signal ER2 that the above-mentioned auxiliary CPU 120b generates. The main CPU 110b is reset and restarted in response to an output from the foregoing OR element 138b.

Numeral 139b designates an OR element with respect to the first error detection signal ER1 and the reset pulse signal RST2 that the above-mentioned main CPU generates. Numeral 140b designates an OR element with respect to the reset pulse signal RST1 that the above-mentioned watchdog timer 130 generates and an output from the above-mentioned OR element 139b. The above-mentioned auxiliary CPU 120b is reset and restarted in response to an output from the foregoing OR element 140b.

Numeral 141b designates an OR element with outputs from the above-mentioned OR elements 138b and 139b acting as inputs. An output terminal of the foregoing OR element 141b is connected to a count input terminal of the above-mentioned count storage circuit 131b.

In addition, the above-mentioned count storage circuit 131b counts and stores operation number of the above-mentioned reset pulse signals RST1 and RST2 or the first and second error detection signals ER1 and ER2. The above-mentioned count storage circuit 131b drives the above-mentioned alarm and display 108 when the foregoing count value is not less than a predetermined value, and a count storage value is reset by the power supply detection circuit 135 when the above-mentioned power supply switch 105b is closed.

Numeral 132b designates a gate circuit (drive stop means). Numeral 137 designates an inversion drive element that drives a load power supply relay 107a via the above-mentioned drive stop means 132b in response to a drive output DR2 that the auxiliary microprocessor 120b generates. The foregoing load power supply relay 107b operates when the drive output DR2 is generated, and the count storage circuit 131b does not count up.

In addition, the above-mentioned auxiliary CPU 120b generates a drive output DR1 to carry out an operation hold of a power supply relay 106*b*, and generates the second error detection signal ER2 or a watchdog clear signal WD2.

As is obvious in the above description, in the electronic control unit according to the foregoing first embodiment, shown in FIG. 1, the associative control circuit 120*a* is constituted of an integrated circuit element employing a logic circuit. Whereas, in the electronic control unit according to this second embodiment, shown in FIG. 11, an auxiliary CPU 120*b* is provided, thereby making it easy to apply the following processing. That is, in this second embodiment, not merely an indirect input signal provided by the second input sensor group 120*b* or the second analog sensor group 103*b* is transmitted to the main CPU 110*b*, but also, e.g., disconnection and short circuit detection of the input sensor group are carried out, or an OR coupling processing with respect to a plurality of input signals is carried out, and thereafter the resultant signals is transmitted to the main CPU 110*b*.

Likewise, in the electronic control unit according to the second embodiment, the auxiliary CPU 120*b* does not drive directly the second electrical load group 140*b* in response to an indirect output signal having been transmitted from the main CPU 110*b*, but a logic processing responsive to an input signal from the second input sensor group 120*b* can be easily applied as well.

Furthermore, the electronic control unit according to the second embodiment makes it easy to add a function to communicate a mutual monitoring information via the first and second series-parallel converters 117 and 127.

Figure 14:
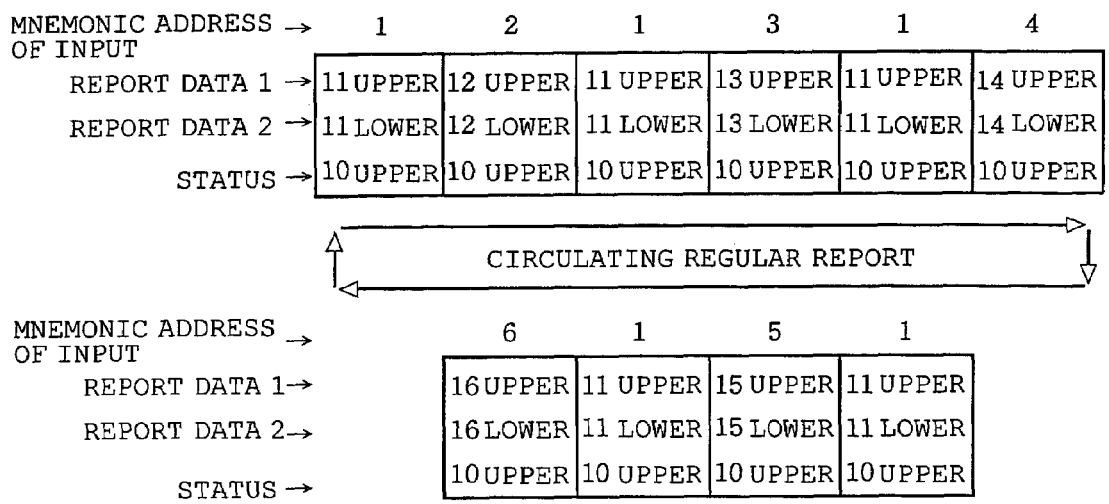
FIG. 14 is a diagram showing the relation of a regular report order in the electronic control unit according to the second embodiment.

FIGS. 12 to 14 show division of addresses to be specified in various communication packets in the electronic control unit according to this second embodiment shown in FIG. 11.

FIG. 12 is a control output and constant set data table, and shows an address division to be specified with a regular transmission packet 401*a* and a reply packet thereof, or an irregular transmission packet 401*b* and a reply packet thereof.

FIG. 13 is a monitoring input data table, and shows an address division to be specified with an irregular transmission packet 401*b* and a reply packet thereof.

Further, FIG. 14 is relation of a regular report order, and shows the relation between a mnemonic address to be specified within status information in the regular report packets 430*c* and 403*d*.

With reference to FIG. 12, addresses 01-08 show the addresses of the second set data memory 237*b* of FIG. 2 and a memory of storing a reply response acceptable time period or a receiving interval acceptable time period. An address 0A is the address with respect to indirect control outputs Y07-Y00 (Y00 corresponds to DR1, and Y01 corresponds to DR2), and an address 0B is the address with respect to indirect control outputs Y17-Y10. Data of each address is 8 bit data.

In addition, set data relating to addresses 01-08 are regularly transmitted in sequence at the time of start of the operation, and thereafter a permission command for the regular report is transmitted to the address 00. Since then, the address 0A and the address 0B are regularly transmitted alternately.

With reference to FIG. 13, addresses 10-17 are the addresses relative to a 16 bit data. However, a status memory of address 10 and a selected data memory of address 17 are as described later in detail referring to FIG. 15.

Further, an address 11 is the address relative to 16 points of indirect input X07-X00, X17-X10, and addresses 12-16 are the addresses of a digital conversion value relative to indirect analog inputs 1-5.

With reference to FIG. 14, a report data 1 and a report data 2 in the first regular report are the indirect analog input 1 and the indirect input 2 shown with the address 11 of FIG. 13. A report data 1 and a report data 2 at the next regular report are digital conversion values of the analog 1 shown in FIG. 13. A report data 1 and a report data 2 at the subsequent regular report are the indirect input 11 and the indirect input 2 again, shown with the address 11 of FIG. 13. A report data 1 and a report data 2 at the further subsequent regular report are digital conversion values of the analog 2 shown in FIG. 13.

The indirect inputs 1 and 2 and the analog 1 to 5 are regularly reported in sequence in the same manner.

Figure 15:
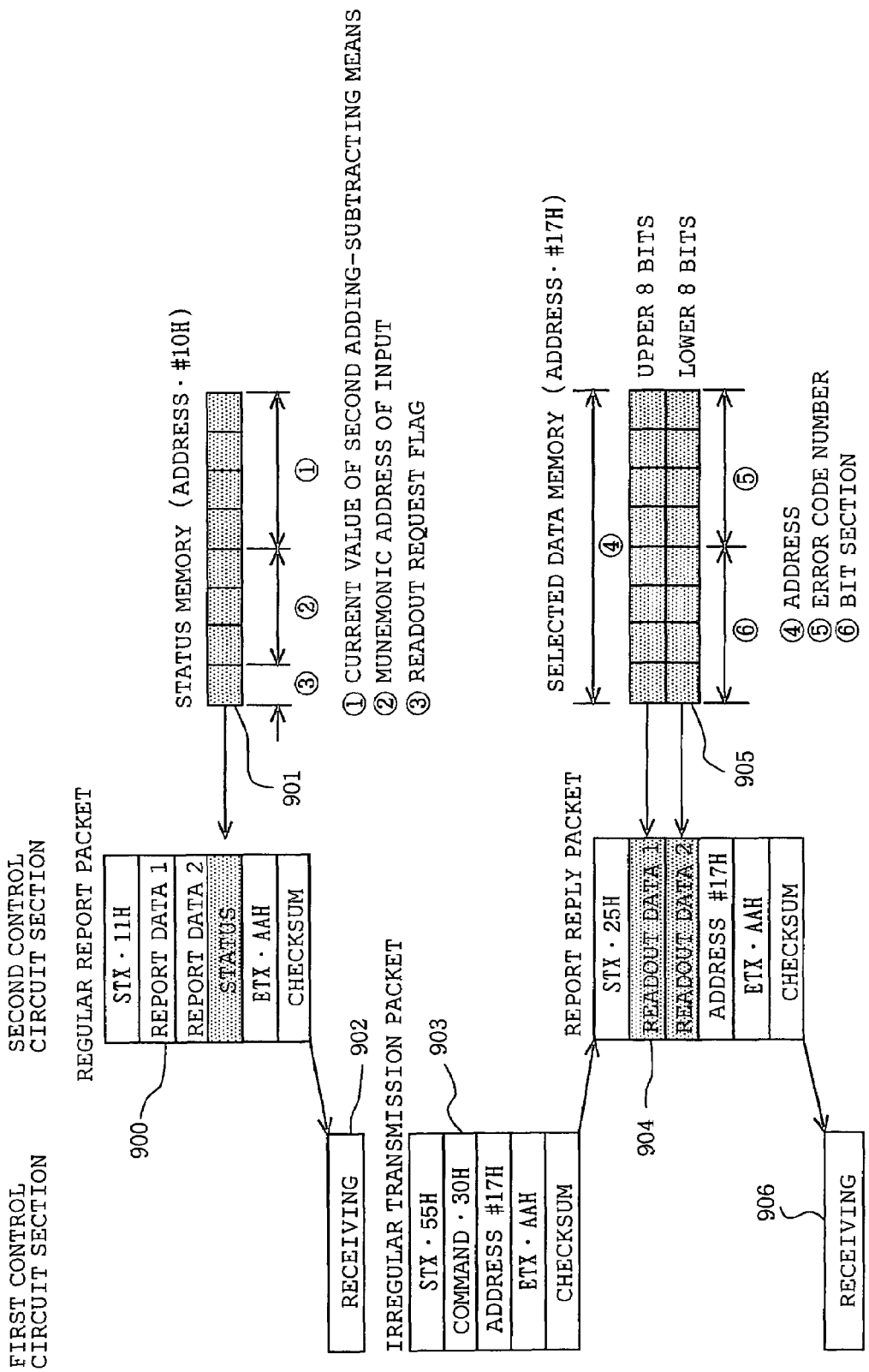
FIG. 15 is a diagram showing the constitution of a readout request transmit-receive packet in the electronic control unit according to the second embodiment.

FIG. 15 shows a constitution of a transmit-receive data relating to the selected data memory having been described in Step 607 of FIG. 9.

With reference to FIG. 15, numeral 900 designates a regular report packet that the second control circuit section 210*b* regularly transmits. In the foregoing regular report packet, digital conversion values of the above-mentioned second input sensor group 102*b* and the second analog sensor group 103*b* are sequentially stored in increment of 2 bites as a report data 1 and a report data 2, and further a status information 901 is stored every time.

The lower 4 bits of the above-mentioned status information 901 are a current value of the second adding-subtracting means 230*b*. The upper 3 bits are a mnemonic address of the above-mentioned report data 1 (value of lower single digit of a monitoring input address of FIG. 13). The uppermost bit is a readout request flag to be a logic level "1" when any error occurs in the second control circuit section 210*b*.

Numeral 902 designates an incoming processing block due to the fact that the first control circuit section 210*a* receives the above-mentioned regular report packet 900. Numeral 903 designates an irregular transmission packet with which the first control circuit section 210*b* carries out a readout request in response to the fact that a readout request flag is detected in the foregoing incoming processing block. An address of a readout location to be specified with the foregoing irregular transmission packet is and address# 17H of a selected data memory.

Numeral 904 designates a report reply packet that the second control circuit section 210*b* having received the above-mentioned irregular transmission packet 903 transmits. As for a content of a selected data memory 905 to be read out with the foregoing report reply packet, the upper 8 bits show an address of the device where error occurs, the lower 4 bits in the lower 8 bits show an error code number, and the upper 4 bits in the lower 8 bits represent a bit section.

In addition, the term "bit section" herein is number information in order to specify an particular input/output with respect to an ON/OFF input/output at the addresses 0A and 0B or the address 11.

Numeral 906 designates a reply incoming processing block responsive to the fact that the first control circuit section 210*a* receives the above-mentioned report reply packet 904. With this reply incoming processing, the first control circuit section 210*a* is capable of acknowledging a site of the error occurrence in the second control circuit section 210*b*.

The basic constitution and operation of the electronic control units according to the foregoing first embodiment and the second embodiment have been described so far. Now, modifications thereof are hereinafter described.

In the above-mentioned electronic control units according to the first embodiment or the second embodiment, the confirmation reply or the report reply from the second control circuit section with respect to the first control circuit section is replied in sequence from in the unprocessed data table; while the regular report from the second control circuit section with respect to the first control circuit section is not contained in the unprocessed data table. However, it is practical to achieve unification of an upstream communication in such a manner that the foregoing regular report command is regularly stored in the unprocessed data table, and the latest report data is attached at the moment of practically reporting and transmitting on the first-in first-out basis.

Further, as for a reply report data to the irregular transmission command, the latest report data is attached and replied at the moment of being practically replied.

As for the rest, in the regular transmission from the first control circuit section with respect to the second control circuit section, it is preferable to sequentially carry out a refresh write as to the addresses 00 to 08 having been transmitted already at the time of the start of operation in such a manner of address 0A→address 00→address 0B→address 01→address 0A→address 02→address 0B→address 03→address 0A→→ . . . .

Furthermore, in the above-mentioned electronic control units according to the foregoing first embodiment or this second embodiment, there is provided the adding-subtracting means for subtracting the first variation value at the time of a normal communication, and adding the second variation value, which is a value larger than the above-mentioned first variation value, at the time of the occurrence of the communication error; and the error occurrence is defined when a current value of the foregoing adding-subtracting means exceeds a predetermined threshold. However, by setting the above-mentioned second variation value to be smaller than the above-mentioned threshold value, it is possible to avoid too sensitive error determination with respect to a sporadic and chronic error in which an abnormal state automatically recovers, and to carry out a retransmission processing in accordance with a history state of the past with respect to a fatal and continuous failure, and then define the error determination immediately.

However, as for the manner of arrangement of the adding-subtracting means, it is preferable that, for example, the lower limit value is set to "–9", an initial value "0", and the upper limit value "3"; and a current value of the adding-subtracting means decreases to "–9" in case of the continuation of a normal communication, the addition with respect to a current value is carried out in case of presence of the communication error, and the error occurrence is defined when this current value exceeds the upper limit value "3".

Furthermore, it is preferable that direction of the addition and subtraction is inverted, for example, a normal-side upper limit value is set to "11", an initial value "3", and an error determination lower limit value "0"; and a current value of the adding-subtracting means increases to "1" in case of continuation of the normal communication, the subtraction with respect to a current value is carried out in case of the presence of the communication error, and the error occurrence is defined when this current value comes to be less than the lower limit value "0".

Additionally, in the above-mentioned electronic control units according to the foregoing first embodiment or this second embodiment, it is arranged such that with respect to various communication errors such as sum check error, timeout error due to the reply delay or the receiving interval error, adding-subtracting means counts a current dangerous state overall, and number of times of the retransmission processing depending upon quantity of allowance up to an error determination threshold value is also determined in a unitary manner.

However, depending upon various communication errors such as sum check error, timeout error due to the reply delay or the receiving interval error, weighting of a variation value to compensate a current value of the adding-subtracting means is determined experimentally and statistically in accordance with a practical-use target, and determined in accordance with an intended degree of safety.

Thus, it is desirable that data of a part or all of various control constants including first variation value, second variation value, third variation value, normal-side limit value, abnormal-side limit value, and initial value to be processed in the above-mentioned first and second adding-subtracting means, or data of a apart or all of various control constants including permitted value of a reply response time period or a receiving interval time period to be used in the above-mentioned first communication error determination means, is transferred and written from the non-volatile program memory cooperating with the main CPU, and the setting change of these constants can be carried out if necessary.

Furthermore, in the above-mentioned electronic control units according to the foregoing first embodiment or this second embodiment, both first and second control circuit sections are described so as to include a control input and a control output that are externally connected. For example, however, it is preferable that the second control circuit section is not provided with any external input/output, and intends to carry out the monitoring control with respect to the first control circuit section.

In this case, it is also preferable that a monitoring target information is transmitted from the first control circuit section to the second control circuit section, and an analysis filed information is transmitted from the second control circuit section to the first control circuit section; and that in case of the presence of error in a monitoring result, this monitoring result error is algebraically added to adding-subtracting means for use in the above-mentioned communication error determination as a compensation variation value.

As for the rest, it is possible that the electronic control unit is applied for use in, for example, a programmable controller arranged such that the first and second control circuit sections are provided remote, and a large number of remote input/output signals are mutually communicated by a serial communication to save number of wiring.

Further, in the above-mentioned electronic control units according to the foregoing first embodiment or this second embodiment, a microprocessor is automatically restarted at the time of the occurrence of error, and arrangements are made so as to continue the operation of the devices as long as possible. It is, however, also possible to change arrangement so that the microprocessor is stopped at the time of occurrence of any error, and can be restarted only at the time of application of manual operation.

Further, it is preferable that, as annunciation means at the time of the occurrence of error at, e.g., an unattended operation facility, an error occurrence time instant is merely saved and an external tool is connected on a timely basis to read out and display a history information, or a printing output with the use of a printer is performed at the time of the occurrence of error.

As described above, an electronic control unit according to this embodiment is provided with:

a first control circuit section 200*a* containing a program memory 115*a* that includes input/output control means with respect to any external equipment and communication control means, an operation processing RAM memory 116*a*, a main CPU 110*a* cooperating with the above-mentioned program memory 115*a*, and a first series-parallel converter 117; and a second control circuit section 200*b* containing a communication control circuit section 120*a* for carrying out a communication of a monitoring and control signal, a data memory 126*a*, and a second series-parallel converter 127;

in which it is arranged such that a serial communication of a monitoring and control signal is carried out mutually between the above-mentioned first control circuit section 200*a* and the above-mentioned second control circuit section 200*b* via the above-mentioned first series-parallel converter 117 and second series-parallel converter 127;

the electronic control unit being characterized in that:

the above-mentioned first control circuit section 200*a* comprises first communication error determination means 207, 217, 223 for determining the presence or absence of any error of data having been received from the above-mentioned second control circuit section 200*b*; first adding-subtracting means 230*a* that subtracts or adds a first variation value when the above-mentioned first communication error determination means 207, 217, 223 determines the absence of error, and adds or subtracts a second variation value when the above-mentioned first communication error determination means determines the presence of the error to carry out an addition and subtraction compensation so as to offset each other, and stops the addition and subtraction compensation with the above-mentioned first variation value at a predetermined normal-side limit value when the determination of the absence of error continues; and first error occurrence definition means 238*a* for generating an error detection signal when a current value of the above-mentioned first adding-subtracting means 230*a* exceeds a predetermined abnormal-side limit value as a result of an accumulation of the above-mentioned first and second variation values;

the above-mentioned second control circuit section 200*b* comprises second communication error determination means 202, 212 for determining the presence or absence of any error of data having been received from the above-mentioned first control circuit section 200*a*; second adding-subtracting means 230*b* that subtracts or adds a first variation value when the above-mentioned second communication error determination means 202, 212 determine the absence of error, and adds or subtracts a second variation value when the above-mentioned second communication error determination means determine the presence of the error to carry out an addition and subtraction compensation with respect to a current value so as to offset each other, and stops the addition and subtraction compensation with the above-mentioned first variation value at a predetermined normal-side limit value when the determination of the absence of error continues; and second error occurrence definition means 238*b* for generating an error detection signal when a current value of the above-mentioned second adding-subtracting means 230*b* exceeds a predetermined abnormal-side limit value as a result of an accumulation of the above-mentioned first and second variation values; and the above-mentioned second variation value is set to be larger than the above-mentioned first variation value, and to be smaller than an permitted accumulation value that is a difference between the above-mentioned abnormal-side limit value and the above-mentioned abnormal-side limit value; and an operation stop or an initiation restart of the above-mentioned first control circuit section 200*a* or the above-mentioned second control circuit section 200*b* is carried out in response to an error detection signal. ER1, ER2 that the above-mentioned first error occurrence definition means 238*a* or second error occurrence definition means 238*b* generates.

As a result, even if a permitted accumulation value is set to be sufficiently large in order to prevent too sensitive error determination with respect to a sporadic and chronic error, a current value of the adding-subtracting means immediately comes to be out of the scope of an abnormal-side limit with the second variation value, being a value larger than the first variation value to define the error occurrence once a fatal and continuous failure occurs. Thus, it is possible to obtain a highly safe and reliable control unit.

Further, in the electronic control unit according to the embodiment, the above-mentioned first control circuit section 200*a* comprises first initialization means 519*a*, 519*b* that resets a current value of the above-mentioned first adding-subtracting means 230*a* to be a predetermined initialization value at the time of the start of operation, and initializes and restarts a communication control circuit section 120*a*, which is provided in the above-mentioned second control circuit section 200*b*, when the above-mentioned first error occurrence definition means 238*a* generates an error detection signal ER1;

in which the above-mentioned second control circuit section 200*b* includes second initialization means 636*a*, 636*b* that resets a current value of the above-mentioned second adding-subtracting means to be a predetermined initialization value at the time of start of operation, and initializes and restarts a main CPU 110*a*, or stops the operation of a main CPU 110*a*, which is provided in the above-mentioned first control circuit section 200*a* when the above-mentioned second error occurrence definition means 238*b* generates an error detection signal ER2; and in which an initialization value of the above-mentioned first adding-subtracting means 230*a* or second adding-subtracting means 230*b* that is reset by the above-mentioned first initialization means and second initialization means is a value close to the above-mentioned abnormal-side limit value.

As a result, a control circuit section on the other side is initialized without depending on a communication line where the error occurs; and a current value of the adding-subtracting means is caused to be close to the abnormal-side limit value at the time of restart thereby enabling to improve safety just after the start.

Further, in the electronic control unit according to the embodiment, the above-mentioned first communication error determination means and second communication error determination means comprises:

bit information monitoring means 540, 613 for determining the presence or absence of bit information relative to data that is communicated between the above-mentioned first control circuit section 200*a* and second control circuit section 200*b*;

reply delay monitoring means 520 for carrying out an error determination in one of the control circuit sections, being a source side when a reply data from the other control circuit section with respect to data that one of the above-mentioned first control circuit section 200*a* and second control circuit section 200*b* transmits, cannot be received even if a predetermined reply response time period has passed; and receiving interval monitoring means 510, 612 for carrying out an error determination when a receiving interval time period on the other-side control circuit section relative to a regular transmission data that the above-mentioned first control circuit section 200*a* transmits, or a regular report data that the second control circuit section 200*b* transmits, exceeds a predetermined value;

in which the above-mentioned first adding-subtracting means 230*a* or second adding-subtracting means 230*b* carries out an addition and subtraction compensation with the first variation value when all of the above-mentioned bit information monitoring means, reply delay monitoring means, and receiving interval monitoring means determine the absence of error.

As a result, a variety of determination of a communication error improves a detection accuracy of the communication error; and the definition of the error occurrence is carried out, concentrating on a pair of adding-subtracting means thereby enabling to carry out a highly accurate error determination.

Further, in the electronic control unit according to the embodiment, with respect to the above-mentioned second variation value that the above-mentioned first adding-subtracting means 230*a* or second adding-subtracting means 230*b* adds or subtracts when the determination of the above-mentioned bit information monitoring means is a communication error, a variation value that the above-mentioned first adding-subtracting means 230*a* or second adding-subtracting means 230*b* adds or subtracts when the determination of the above-mentioned reply delay monitoring means 520 or receiving interval monitoring means 510, 612 is the communication error, is established to be a third variation value, being a value larger than the above-mentioned second variation value; and the above-mentioned third variation value is a value smaller than an permitted accumulation value, being a difference between the above-mentioned abnormal-side limit value and normal-side limit value.

As a result, weighting a variety of determination of the communication error can carry out the error determination. In addition, it is unnecessary to set an excessive float as to a timeout error such as reply delay or receiving interval excess, and it is also possible to set a determination time period appropriate for a raw power, thereby enabling to carry out a highly accurate timeout determination.

Further, in the electronic control unit according to the embodiment, the above-mentioned second control circuit section 200*b* comprises confirmation reply means 205 for carrying out a confirmation reply of a receiving state of whether or not the above-mentioned second control circuit section normally receives data having been transmitted from the above-mentioned first control circuit section 200*a*; and in which when a reply content provided by the above-mentioned confirmation reply means 205 is a receiving failure showing a state of a bit error that is determined by bit information monitoring means 613 in the above-mentioned second control circuit section 200*b*, when reply delay monitoring means 520 executes a delay error determination of a reply response in the above-mentioned first control circuit section 200*a*, or when bit information monitoring means 540 executes a bit error determination in the above-mentioned first control circuit section 200*a*, the above-mentioned first control circuit section 200*a* updates the last transmitted data, and retransmits the resultant data to the above-mentioned second control circuit section 200*b*; and the above-mentioned first control circuit section 200*a* comprises retransmission means that adds or subtracts the above-mentioned second variation value to a value of the above-mentioned first adding-subtracting means 230*a*.

As a result, in the case where the communication error still occurs even if the retransmission processing continues, the error determination is carried out based on the fact that a current value of the first adding-subtracting means 230*a* is outside of the abnormal-side limit value, and the initialization and restart is carried out. Consequently, it is possible to reasonably regulate number of times of permitted retransmission processing depending on the past history of whether or not a normal communication has continued.

In the electronic control unit according to the embodiment, the above-mentioned first control circuit section 200*a* comprises a reply-waiting data table 206 acting as a transmission-side command memory that is arranged so as to sequentially save a transmission command having been transmitted to the above-mentioned second control circuit section 200*b*, and to sequentially delete the above-mentioned saved command when having received the above-mentioned confirmation reply data;

In which the above-mentioned second control circuit section 200*b* comprises an unprocessed data table 204 acting as a receiving-side command memory that is arranged so as to sequentially save a reply command for executing a confirmation reply when receiving a transmitted data from the above-mentioned first control circuit section, and to sequentially delete the above-mentioned saved command when transmitting a confirmation reply data to the above-mentioned first control circuit section 200*a*; and in which the above-mentioned reply delay monitoring means 520 executes an error determination when a save time period of a leading data having remained in the above-mentioned reply-waiting data table 206 exceeds a predetermined value, and a transmission command determined to be the reply error and a transmission command having a confirmation reply of the receiving failure are sequentially deleted from the above-mentioned reply-waiting data table 206, and is stored again in the above-mentioned reply-waiting data table 206 when it is retransmitted.

As a result, even if an upstream communication from the second control circuit section 200*b* to the first control circuit section 200*a* is temporarily jammed, it is possible for the first control circuit section 200*a* to make a transmission with respect to the second control circuit section 200*b* at any time, and define a command to be retransmitted and processed when the communication error occurs.

Further, in the electronic control unit according to the embodiment, the above-mentioned first control circuit section 200*a* comprises regular transmission means 201 that regularly transmits a control output data or a constant set data with respect to the above-mentioned second control circuit section, and replies a confirmation reply data of whether or not the above-mentioned second control circuit section 200*b* receives the above-mentioned regular transmission data; and irregular transmission means 211 that irregularly carries out a readout request for a monitoring input data of a specified address or a save data provided by the above-mentioned regular transmission means, and executes the report reply of the monitoring input data or the save data having been requested as a confirmation reply data of whether or not the above-mentioned second control circuit section 200b receives the above-mentioned irregular transmission data;

In which the above-mentioned second control circuit section 200b comprises regular report means 221 for regularly reporting a monitoring input data with respect to the above-mentioned first control circuit section 200a; and the above-mentioned first control circuit section 200a is arranged so as to be capable of confirming again a regular report content with the above-mentioned irregular transmission means 211 when the bit error determination relative to a regular report data having been reported from the above-mentioned second control circuit section 200b is carried out, or when the receiving interval error determination is carried out relative to a regular report data.

As a result, the confirmation reply with respect to the regular report is not carried out every time, so that an amount of downstream communication is reduced thereby enabling to diminish the load of communication control; and it is possible for the first control circuit section 200a to confirm a content of the regular report with irregular transmission means 211 at the time of executing the bit error determination relative to a regular report data having been reported from the second control circuit section 200b, or at the time of executing the receiving interval error determination relative to a regular report data.

Further, in the electronic control unit according to the embodiment, status information is contained in data to be regularly reported by the above-mentioned regular report means in addition to the above-mentioned monitoring input data; and a current value data of the above-mentioned second adding-subtracting means is contained in the above-mentioned status information.

As a result, it is possible for the first control circuit section 200a to monitor in a comprehensive manner a current value o the first and second adding-subtracting means 230a, 230b; and it is possible for the first control circuit section 200a to immediately detect any error with the status information in the case of occurrence of any receiving interval error of the second control circuit section 200b with respect to the regular transmission.

Further, in the electronic control unit according to the embodiment, status information is contained in data to be regularly reported by the above-mentioned regular report means 221 in addition to the above-mentioned monitoring input data; in which the above-mentioned second control circuit section 200b comprises a selected data memory 126a in which a data of a specified address intended to be immediately read out from the first control circuit section 200a is selected and stored; and readout request setting means 608 for adding a readout request flag to the above-mentioned status information as information of requesting for a content of the above-mentioned selected data memory 126a to be read out with respect to the above-mentioned first control circuit section 200a; and in which the above-mentioned first control circuit section 200a is arranged so as to specify the above-mentioned specific address with the above-mentioned irregular transmission means 211, and to be capable of receiving a report reply of a content of the above-mentioned selected data memory 126a.

As a result, the second control circuit section 200b does not merely carry out the regular report, but also can request for a content of the selected data memory 126a to be immediately read out as the need arises, so that it is possible for the second control circuit section 200b to immediately report to the first control circuit section 200a error information other than the communication error while reducing an amount of the regular report data.

Further, in the electronic control unit according to the embodiment, the above-mentioned first control circuit section 200a comprises regular repot permission means 401c for storing a command data that is transmitted by the above-mentioned regular transmission means 201 with respect to a memory of a predetermined address, which is provided in the above-mentioned second control circuit section 200b, and permits for the second control circuit section 200b to transmit the above-mentioned regular report;

in which the above-mentioned second control circuit section 200b comprises permitted time period determination means 644 for determining whether or not a time period until the above-mentioned regular report is permitted after the start of operation exceeds a predetermined value; and in which the second variation value is added to or subtracted from a value of the above-mentioned second adding-subtracting means 230b when the above-mentioned permitted time period determination means 644 determines a time period excess, and the determination operation of the above-mentioned permitted time period determination means 644 starts again.

As a result, jam-up of communication is avoided by inhibiting the regular reporting from the second control circuit section 200b when, e.g., a large amount of initialization set data are transmitted from the first control circuit section 200a to the second control circuit section 200b at the time of the start of operation. Furthermore, when the regular report permission is delayed, the addition or subtraction with the second variation value is repeated, thereby achieving the definition of error occurrence, and enabling to inhibit the continuation of abnormal operation state.

Further, in the electronic control unit according to the embodiment, the above-mentioned first control circuit section 200a comprises a set data memory 237a in which stored are a part or all of various control constants including first variation value, second variation value, normal-side limit value, abnormal-side limit value, and initial value to be processed in the above-mentioned first adding-subtracting means 230a; or a part or all of various control constants including permitted values of a reply response time period or a receiving interval time period to be used in the above-mentioned first communication error determination means 207, 217, 223; in which a part or all of the above-mentioned various control constants are transferred and written from a program memory 115a cooperating with the above-mentioned main CPU 110a.

As a result, it is possible to change various control constants depending on operation environment, and easily optimize definition conditions for error occurrence.

Further, in the electronic control unit according to the embodiment, the above-mentioned second control circuit section 200b comprises a second set data memory 237b in which stored are a part or all of various control constants including first variation value, second variation value, normal side limit value, abnormal-side limit value, and initial value to be processed in the above-mentioned second adding-subtracting means 230b; or a part or all of various control constants including permitted value of a receiving interval time period to be used in the above-mentioned second communication error determination means 202; in which a part or all of the above-mentioned various control constants are transmitted and written by the above-mentioned regular transmission means 201 from a program memory cooperating with the above-mentioned main CPU 110a.

As a result, it is possible to change various control constant depending on operation environment, and to easily optimize definition condition for error occurrence. In addition, it is possible to set different conditions for defining the error occurrence between in the first and second control circuit sections 200a and 200b, and carry out a variety of error determinations.

Further, an electronic control unit 100b according to the second embodiment is provided with:

a first control circuit section 210a containing a program memory 115b including input/output control means with respect to any external equipment and communication control means, an operation processing RAM memory 116b, a main CPU 110b cooperating with the above-mentioned program memory 115b, a direct input signal interface circuit 112a, a direct output signal interface circuit 114a, and a first series-parallel converter 117; and a second control circuit section 210b containing a communication control circuit section 120b for carrying out communication of a monitoring and control signal, a data memory 126b, and a second series-parallel converter 127;

in which a serial communication of a monitoring and control signal is carried out mutually between the above-mentioned first control circuit section 210a and the above-mentioned second control circuit section 210b via the above-mentioned first series-parallel converter 117 and the above-mentioned second series-parallel converter 127; and in which the above-mentioned main CPU 110b is arranged to generate an output signal in response to a direct input signal having been inputted via the above-mentioned direct input signal interface circuit 112a, an indirect input signal having been received by a serial communication from the second series-parallel converter 127, which is provided in the above-mentioned second control circuit section 210b, and a content of the above-mentioned program memory 115b to drive an electrical load group connected to the above-mentioned direct output signal interface circuit 114a; and to transmit an indirect output signal to the second control circuit section 210b via the above-mentioned first and second series-parallel converters 117, 127;

the electronic control unit being characterized in that:

the above-mentioned first control circuit section 210a comprises first receiving interval error determination means 115b for determining that a receiving interval of a communication data to be regularly reported from the above-mentioned second control circuit section 210b exceeds a first threshold value, and generating a first error detection signal ER1;

the above-mentioned second control circuit section 210b comprises second receiving interval error determination means 125 for determining that a receiving interval of a communication data to be regularly transmitted from the above-mentioned first control circuit section exceeds a second threshold value, and generating a second error detection signal ER2;

one of the above-mentioned first control circuit section 210a and the above-mentioned second control circuit section 210b comprises a watchdog timer 130 that watches a watchdog clear signal WD1, which the above-mentioned main CPU 110b generates, and generates a reset pulse signal RST1 when a pulse width of the above-mentioned watchdog clear signal WD1 exceeds a predetermines limit value, being a value smaller than the above-mentioned second threshold value; and error occurrence storage means 131b that stores an error detection signal ER1, ER2 or a reset pulse signal RST1, and brings annunciation means 108 such as alarm, display, printing, and history save when the above-mentioned first and second error detection signal ER1, ER2 is generated, or when the above-mentioned watchdog timer 130 generates a reset pulse signal RST1; and in which the above-mentioned main CPU 110b is initialized and restarted when the above-mentioned watchdog timer 130 generates a reset pulse signal RST1, or when the above-mentioned second error detection signal ER2 is generated; and a communication control circuit section 120b of the above-mentioned second control circuit section 210b is initialized and restarted when the above-mentioned watchdog timer 130 generates a reset pulse signal RST1, or the above-mentioned first error detection signal ER1 is generated.

As a result, it is possible to restart the main CPU 110b without depending on a communication line where any error occurs. Further, at the time of occurrence of any run-away error of the main CPU 110b, initialization of the first control circuit section 210a is immediately carried out, being free from waiting for the determination of the second receiving interval error determination means, thereby enabling to carry out a safe restart.

Furthermore, even in the case where the error is a temporary noise malfunction of the main CPU 110b, and the main CPU 110b is caused to immediately restart in a normal manner, the fact of error occurrence is defined thereby enabling to induce maintenance inspection.

Further, in the electronic control unit according to the embodiment, the above-mentioned second control circuit section 210b comprises an auxiliary program memory 125 that includes input/output means with respect to any external equipment and communication means, an operation processing auxiliary RAM memory 126b, and an auxiliary CPU 120b that cooperates with the above-mentioned auxiliary program memory 125, transmits an indirect input signal having been inputted via an indirect input signal interface circuit 122b to the first control circuit section 210a via the above-mentioned first and second series-parallel converters 117, 127; and drives an electrical load group, which is connected to the above-mentioned indirect output signal interface circuit, with an indirect output signal having been received via the above-mentioned first and second series-parallel converters 117, 127 from the above-mentioned first control circuit section 210a;

in which the above-mentioned first control circuit section 210a comprises run-away monitoring means 115b that monitors a watchdog clear signal WD2, being a pulse train, which the above-mentioned auxiliary CPU 120b generates, at the above-mentioned main CPU 110b, and generates a reset pulse signal RST2 when a pulse width of the above-mentioned watchdog clear signal WD2 exceeds a predetermined limit value, being a value smaller than the above-mentioned first threshold value; and in which the above-mentioned auxiliary CPU 120b is initialized and restarted, and the above-mentioned error occurrence storage means 131b stores an error occurrence when the above-mentioned run-away monitoring means 115b generates a reset pulse signal RST2, when the above-mentioned watchdog timer 130 generates a reset pulse signal RST1, or when the above-mentioned first error detection signal is generated.

As a result, it is possible to restart the auxiliary CPU 120b without depending on a communication line where the error occurs. Furthermore, at the time of occurrence of any run-away error of the auxiliary CPU 120b, initialization of the second control circuit section 210b is immediately carried out, being free from waiting for the determination of the first receiving interval error determination means.

Furthermore, even in the case where the error is due to any temporary noise malfunction of the auxiliary CPU 120b, and the auxiliary CPU 120b is caused to immediately restart in a normal manner, the fact of the error occurrence is defined, thereby enabling to induce maintenance inspection.

Further, in the electronic control unit according to the embodiment, the above-mentioned error occurrence storage means 131b is constituted of a count storage circuit; and the above-mentioned count storage means counts an OR output relative to the above-mentioned first and second error detection signal ER1, ER2 and a reset pulse signal RST1, RST2 provided by the watchdog timer o130 or the run-away monitoring means 115b, and brings the above-mentioned annunciation means 108 in operation when the count value reaches a predetermined value.

As a result, it is possible to set a determination threshold value of the watchdog timer 130 to be a strict value matching a raw power cycle of a watchdog timer clear signal WD1, and execute an accurate run-away determination; and it is possible to prevent any error alarm from being carried out in vain.

In addition, since there is provided OR means, any communication error due to run-away error is not counted redundantly.

Further, in the electronic control unit according to the embodiment, at least one of the above-mentioned first control circuit section 200a and second control circuit section 200b comprises drive stop means 132a that acts when the above-mentioned error occurrence storage means 131a stores any error occurrence, and inhibits driving of a part of specified electrical loads in the above-mentioned electrical load group; and clear means that resets and clears an error storage signal provided by the above-mentioned error occurrence storage means 131a by manual operation such as turning on a power supply switch 105b.

As a result, even in the case where the error is a temporary noise malfunction, and the electronic control unit is immediately restarted normally, driving the specified electrical load associated with safety is stopped thereby improving the safety. Furthermore, it is possible to cause the electronic control unit to return to the normal operation state by manual operation.

Further, in the electronic control unit according to the embodiment, at least one of the above-mentioned first control circuit section 210a and second control circuit section 210b comprises drive stop means 132b that acts when a count value of the above-mentioned count storage circuit is not less than a predetermined value, and inhibits driving of a part of specified electrical loads in the above-mentioned electrical load group; and clear means that resets and clears a current value of the above-mentioned count storage circuit by manual operation such as turning on a power supply switch 105b.

As a result, even in the case where the error is due to temporary noise malfunction, and the device is immediately restarted normally, driving the specified electrical load associated with safety is stopped thereby improving the safety. Furthermore, it is possible to cause the device to return to the normal operation state by manual operation.

While the presently preferred embodiments of the present invention have been shown and described.

It is to be understood that these disclosures are for the purpose of illustration and that various changes and modifications may be made without departing from the scope of the invention as set forth in the appended claims.

What is claimed is:

1. An electronic control unit comprising:
   a first control circuit section which comprises:
      a program memory with input/output control means and communication control means with respect to external equipment,
      an operation processing memory,
      a main processing unit which cooperates with said program memory, and a first series-parallel converter; and
   a second control circuit section which comprises:
      a communication control circuit section which carries out a communication of a monitoring and control signal,
      a data memory, and
      a second series-parallel converter,
   wherein said electronic control unit is arranged such that serial communication of the monitoring and control signal is carried out mutually between said first control circuit section and said second control circuit section via said first series-parallel converter and second series-parallel converter,
   wherein said first control circuit section further comprises:
      first communication error determination means for determining presence or absence of any error of data received from said second control circuit section;
      first adding-subtracting means that performs a first operation on a first variation value when said first communication error determination means determines the absence of error, and performs a second operation on a second variation value when said first communication error determination means determines the presence of the error in order to carry out a first addition and subtraction compensation with respect to a first current value, and stops the first addition and subtraction compensation at a normal-side limit value when the determination of the absence of error continues; and
      first error occurrence definition means for generating an error detection signal when the first current value of said first adding-subtracting means exceeds an abnormal-side limit value as a result of an accumulation of said first and second variation values; and
   wherein said second control circuit section further comprises:
      second communication error determination means for determining the presence or absence of error of data received from said first control circuit section;
      second adding-subtracting means that performs the first operation on the first variation value when said second communication error determination means determines the absence of error, and performs the second operation on the second variation value when said second communication error determination means determines the presence of the error to carry out a second addition and subtraction compensation with respect to a second current value, and stops the second addition and subtraction compensation at the normal-side limit value when the determination of the absence of error continues; and second error occurrence definition means for generating an error detection signal when the second current value of said second adding-subtracting means exceeds the predetermined abnormal-side limit value as a result of an accumulation of said first and second variation values, and wherein the second variation value is set to be a value larger than said first variation value and smaller than a permitted accumulation value that is a difference between said abnormal-side limit value and said normal-side limit value; and operation stop or initiation restart of the said first control circuit section or said second control circuit section is carried out in response to an error detection signal generated by the said first error occurrence definition means or second error occurrence definition means.

2. The electronic control unit according to claim 1, wherein said first control circuit section comprises first initialization means for resetting the first current value of said first adding-subtracting means to be an initialization value at the time of start of operation, and initializing and restarting the communication control circuit section, when said first error occurrence definition means generates an error detection signal;

wherein said second control circuit section comprises second initialization means for resetting the second current value of said second adding-subtracting means to be a predetermined initialization value at the time of staff of operation, and initializing and restarting the main processing unit, or stops operation of the main processing unit, when said second error occurrence definition means generates an error detection signal; and wherein an initialization value of said first adding-subtracting means or second adding-subtracting means that is reset by said first initialization means or second initialization means is a value close to said abnormal-side limit value.

3. The electronic control unit according to claim 1, wherein said first communication error determination means and said second communication error determination means comprise:

bit information monitoring means for determining presence or absence of any bit information relative to data that is communicated between said first control circuit section and second control circuit section;

reply delay monitoring means for carrying out a first error determination in the first control circuit section, being a source side when a reply data from the second control circuit section, with respect to data that said first control circuit section transmits, cannot be received even if a reply response time period has passed; and receiving interval monitoring means for carrying out a second error determination when a receiving interval time period on the other-side control circuit section relative to a regular transmission data that said first control circuit section transmits or a regular report data that the second control circuit section transmits exceeds a receiving interval value, and wherein said first adding-subtracting means or second adding-subtracting means carries out the first or second operations, respectively, with the first variation value when all of said bit information monitoring means, reply delay monitoring means, and receiving interval monitoring means determine the absence of error.

4. The electronic control unit according to claim 3, wherein with respect to said second variation value that said first adding-subtracting means or second adding-subtracting means performs said second operation when the determination of said bit information monitoring means is a communication error, a variation value that said first adding-subtracting means or second adding-subtracting means performs said second operation on when the determination of said reply delay monitoring means or receiving interval monitoring means is the communication error, is established to be a third variation value, being a value larger than said second variation value, and said third variation value is a value smaller than a permitted accumulation value, being the difference between said abnormal-side limit value and normal-side limit value.

5. The electronic control unit according to claim 3, wherein said second control circuit section comprises confirmation reply means for carrying out a confirmation reply of a receiving state, said receiving state indicating if said second control circuit section normally receives data transmitted from said first control circuit section; and wherein, when a reply content provided by said confirmation reply means is a receiving failure showing a state of a bit error that is determined by bit information monitoring means in said second control circuit section, when reply delay monitoring means executes a delay error determination of a reply response in said first control circuit section, or when bit information monitoring means executes a bit error determination in said first control circuit section, said first control circuit section updates last transmitted data and retransmits resultant data to said second control circuit section, and wherein said first control circuit section further comprises retransmission means that performs said second operation on said second variation value and said first current value of said first adding-subtracting means.

6. The electronic control unit according to claim 5, wherein said first control circuit section comprises a reply-waiting data table acting as a transmission-side command memory that sequentially saves a transmission command transmitted to said second control circuit section, and sequentially deletes said saved transmission command when said confirmation reply data has been received;

wherein said second control circuit section comprises an unprocessed data table acting as a receiving-side command memory that sequentially saves a reply command for executing a confirmation reply when receiving a transmitted data from said first control circuit section, and sequentially deletes said saved command when a confirmation reply data is transmitted to said first control circuit section; and wherein said reply delay monitoring means executes an error determination when a save time period of a leading data having remained in said reply-waiting data table exceeds a save time value, and wherein a transmission command determined to be the reply error and a transmission command having a confirmation reply of the receiving failure are sequentially deleted from said reply-waiting data table, and are stored again in said reply-waiting data table when retransmitted.

7. The electronic control unit according to claim 3, wherein said first control circuit section comprises regular transmission means said regular transmission data comprising that regularly transmits a control output data or a constant set data to said second control circuit section, and replies a confirmation reply data that indicates if said second control circuit section receives said regular transmission data; and irregular transmission means that irregularly carries out a readout request for a monitoring input data of a specified address or a save data provided by said regular transmission means with respect to said second control circuit section, and executes a report reply of the monitoring input data or the save data having been requested as a confirmation reply data that indicates if said second control circuit section receives irregular transmission data, wherein said second control circuit section comprises regular report means for regularly reporting said monitoring input data to said first control circuit section; and said first control circuit section is capable of confirming again a regular report content with said irregular transmission means when the bit error determination relative to the regular report data reported from said second control circuit section is carried out or when the receiving interval error determination is carried out relative to the regular report data.

8. The electronic control unit according to claim 7, wherein status information is contained in data to be regularly reported by said regular report means in addition to said monitoring input data; and wherein a current value data of said second adding-subtracting means is contained in said status information.

9. The electronic control unit according to claim 7, wherein status information is contained in data to be regularly reported by said regular report means in addition to said monitoring input data;

wherein said second control circuit section comprises a selected data memory of a specified address, in which data intended to be immediately read out from the first control circuit section is selected and stored; and readout request setting means for adding a readout request flag to said status information as request information that a content of said selected data memory is read out with respect to said first control circuit section; and wherein said first control circuit section specifies said specific address with said irregular transmission means and receives a report reply of a content of said selected data memory.

10. The electronic control unit according to claim 7, wherein said first control circuit section comprises regular repot permission means for storing a command data that is transmitted by said regular transmission means to a memory of a predetermined address, which is provided in said second control circuit section, and permits the second control circuit section to transmit said regular report;

wherein said second control circuit section comprises permitted time period determination means for determining if a time period until said regular report is permitted from the start of operation exceeds a permitted time value; and wherein said second operation is formed on the second variation value from a value of said second adding-subtracting means when said permitted time period determination means determines a time period excess, and the determination operation of said permitted time period determination means starts again.

11. The electronic control unit according to claim 3, wherein said first control circuit section comprises a set data memory in which at least some of control constants including first variation value, second variation value, normal-side limit value, abnormal-side limit value, and initial value to be processed in said first adding-subtracting means or at least some control constants including permitted values of a reply response time period and a receiving interval time period to be used in said first communication error determination means are stored; and wherein a part or all of said various control constants are transferred and written from a program memory cooperating with said main processing unit.

12. The electronic control unit according to claim 7, wherein said second control circuit section comprises a second set data memory in which at least a part of control constants including first variation value, second variation value, normal-side limit value, abnormal-side limit value, and initial value to be processed in said second adding-subtracting means are stored or at least of control constants including permitted value of a receiving interval time period to be used in said second communication error determination means are stored; and at least a part of said control constants are transmitted and written by said regular transmission means from a program memory cooperating with said main processing unit.

13. The electronic control unit according to claim 1, wherein if said first operation is addition, said second operation is subtraction, and if said first operation is subtraction, said second operation is addition.

14. An electronic control unit comprising:
a first control circuit section comprising:
a program memory with input/output control means and communication control means with respect to external equipment,
an operation processing memory,
a main processing unit cooperating with said program memory,
a direct input interface circuit,
a direct output interface circuit, and
a first series-parallel converter; and
a second control circuit section comprising:
a communication control circuit section for carrying out communication of a monitoring and control signal,
a data memory, and
a second series-parallel converter,
wherein said electronic control unit is arranged such that serial communication of a monitoring and control signal is carried out mutually between said first control circuit section and said second control circuit section via said first series-parallel converter and second series-parallel converter,
wherein said main processing unit generates an output signal in response to a direct input signal having been inputted via said direct input interface circuit, an indirect input signal having been received by serial communication from the second series-parallel converter, which is provided in said second control circuit section, and a content of the program memory to drive an electrical load group connected to said direct output signal interface circuit; and transmits an indirect output signal to the second control circuit section via said first and second series-parallel converters;
wherein said first control circuit section includes first receiving interval error determination means for determining that a receiving interval of a communication data to be regularly reported from said second control circuit section exceeds a first threshold value, and generating a first error detection signal; and said second control circuit section includes second receiving interval error determination means for determining that a receiving interval of a communication data to be regularly transmitted from said first control circuit section exceeds a second threshold value, and generating a second error detection signal;

wherein one of said first control circuit section and said second control circuit section includes a watchdog timer that watches a watchdog clear signal, which said main processing unit generates, and generates a reset pulse signal when a pulse width of said watchdog clear signal exceeds a pulse width limit value, being a value smaller than said second threshold value; and error occurrence storage means for storing an error detection signal or a reset pulse signal, and bringing annunciation means in operation when said first and second error detection signal is generated, or when said watchdog timer generates a reset pulse signal; and wherein said main processing unit is initialized and restarted when said watchdog timer generates a reset pulse signal or when said second error detection signal is generated; and said communication control circuit section of said second control circuit section is initialized and restarted when said watchdog timer generates a reset pulse signal or said first error detection signal is generated.

15. The electronic control unit according to claim 14, wherein said second control circuit section comprises an auxiliary program memory including input/output means with respect to external equipment and communication means, an operation processing auxiliary memory, and an auxiliary processing unit that cooperates with said auxiliary program memory, transmits the indirect input signal associated with a signal having been inputted via an indirect input signal interface circuit to the first control circuit section via said first and second series-parallel converters, and drives an electrical load group, which is connected to said direct output signal interface circuit, with an output signal associated with an indirect output signal having been received via said first and second series-parallel converters from said first control circuit section;

wherein said first control circuit section comprises run-away monitoring means that for monitoring an auxiliary watchdog clear signal, being a pulse train, which said auxiliary CPU generates, at said main CPU, and generating a reset pulse signal when a pulse width of said auxiliary watchdog clear signal exceeds an auxiliary pulse width limit value, being a value smaller than said first threshold value; and wherein said auxiliary CPU is initialized and restarted, and said error occurrence storage means stores an error occurrence when said run-away monitoring means generates the reset pulse signal, when said auxiliary watchdog timer generates the reset pulse signal or when said first error detection signal is generated.

16. The electronic control unit according to claim 14, wherein said error occurrence storage means is constituted of a count storage circuit; and said count storage means counts an OR output relative to said first and second error detection signal and a reset pulse signal provided by the watchdog timer or the run-away monitoring means, and brings said annunciation means in operation when a count value reaches a count limit value.

17. The electronic control unit according to claim 14, wherein at least one of said first control circuit section and second control circuit section comprises drive stop means for acting when said error occurrence storage means stores the error occurrence, and inhibiting driving of a part of specified electrical loads in said electrical load group; and clear means and for resetting and clearing an error storage signal provided by said error occurrence storage means by manual operation.

18. The electronic control unit according to claim 16, wherein at least one of said first control circuit section and second control circuit section comprises drive stop means for acting when a count value of said count storage circuit is not less than a count storage limit value, and inhibiting driving of a part of specified electrical loads in said electrical load group; and clear means for resetting and clearing a current value of said count storage circuit by manual operation.

* * * * *